United States Patent
Dou et al.

(10) Patent No.: US 10,798,770 B2
(45) Date of Patent: Oct. 6, 2020

(54) METHOD, APPARATUS, AND SYSTEM FOR ESTABLISHING SESSION

(71) Applicant: Huawei Technologies Co., Ltd., Shenzhen (CN)

(72) Inventors: Fenghui Dou, Beijing (CN); Hui Jin, Beijing (CN); Guowei Ouyang, Beijing (CN); Yue He, Beijing (CN); Haorui Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/495,667

(22) PCT Filed: Mar. 20, 2017

(86) PCT No.: PCT/CN2017/077384
§ 371 (c)(1),
(2) Date: Sep. 19, 2019

(87) PCT Pub. No.: WO2018/170704
PCT Pub. Date: Sep. 27, 2018

(65) Prior Publication Data
US 2020/0092934 A1 Mar. 19, 2020

(51) Int. Cl.
*H04W 76/19* (2018.01)
*H04W 76/38* (2018.01)
(Continued)

(52) U.S. Cl.
CPC ............. *H04W 76/19* (2018.02); *H04W 8/02* (2013.01); *H04W 72/04* (2013.01); *H04W 76/38* (2018.02); *H04W 80/02* (2013.01); *H04W 84/042* (2013.01)

(58) Field of Classification Search
CPC ....... H04W 76/19; H04W 76/38; H04W 8/02; H04W 72/04; H04W 80/02;
(Continued)

(56) References Cited

U.S. PATENT DOCUMENTS

2007/0025357 A1* 2/2007 Zhang .................. H04L 47/50
370/395.4
2014/0155068 A1 6/2014 Porat
(Continued)

FOREIGN PATENT DOCUMENTS

CN 105813079 A 7/2016

OTHER PUBLICATIONS

SA WG2 Meeting #119, S2-171079 Feb. 13-17, 2017, 3 Pages, Year 2017 (Year: 2017).*
(Continued)

*Primary Examiner* — Inder P Mehra
(74) *Attorney, Agent, or Firm* — Conley Rose, P.C.

(57) ABSTRACT

A session establishment method includes receiving, by a mobility management function AMF entity, a first message sent by user equipment UE, where the first message carries identifier information, the identifier information is used to instruct the AMF entity to send the first message to a session management function SMF entity, and the first message is used to instruct the SMF entity to re-establish a session with the UE based on the identifier information by using a first user plane function UPF entity; and sending, by the AMF entity based on the identifier information, the first message to the SMF entity associated with the identifier information.

20 Claims, 21 Drawing Sheets

(51) Int. Cl.
  *H04W 8/02* (2009.01)
  *H04W 72/04* (2009.01)
  *H04W 80/02* (2009.01)
  *H04W 84/04* (2009.01)
  *H04W 36/00* (2009.01)

(58) Field of Classification Search
  CPC .......... H04W 84/042; H04W 36/0011; H04W 36/12; H04W 76/11; H04W 76/12
  USPC ........................................................ 455/450
  See application file for complete search history.

(56) References Cited

U.S. PATENT DOCUMENTS

| | | | |
|---|---|---|---|
| 2015/0215987 A1* | 7/2015 | Kim .................... | H04L 1/1848 370/329 |
| 2017/0070892 A1 | 3/2017 | Song et al. | |
| 2019/0150219 A1* | 5/2019 | Wang ................. | H04W 36/0033 370/329 |
| 2019/0289506 A1* | 9/2019 | Park ................... | H04W 8/08 |

OTHER PUBLICATIONS

Machine Translation and Abstract of Chinese Publication No. CN105813079, Jul. 27, 2016, 16 pages.
3GPP TR 23.799, V14.0.0, "3rd Generation Partnership Project; Technical Specification Group Services and System Aspects; Study on Architecture for Next Generation System (Release 14)," Dec. 2016, 522 pages.
3GPP TS 23.501, V0.3.1, "3rd Generation Partnership Project; Technical Specification Group Services and System Aspects; System Architecture for the 5G System; Stage 2 (Release 15)," Mar. 2017, 97 pages.
3GPP TS 23.502, V0.2.0, "3rd Generation Partnership Project; Technical Specification Group Services and System Aspects; Procedures for the 5G System; Stage 2 (Release 15)," Feb. 2017, 71 pages.
S2-170141, Ericsson, "23.501: SMF selection," SA WG2 Meeting #118BIS, Jan. 16-20, Spokane, WA, USA, 3 pages.
S2-171079, Samsung, "TS 23.502: P-CR on UPF relocation procedure for SSC mode 2 and 3," SA WG2 Meeting #119, Feb. 13-17, 2017, Dubrovnik, Croatia, 3 pages.
S2-171560, Samsung, "TS 23.502: P-CR on UPF relocation procedure for SSC mode 2," SA WG2 Meeting #119, Feb. 13-17, 2017, Dubrovnik, Croatia, 2 pages.
Foreign Communication From a Counterpart Application, PCT Application No. PCT/CN2017/077384, English Translation of International Search Report dated Jun. 29, 2017, 2 pages.
Foreign Communication From a Counterpart Application, PCT Application No. PCT/CN2017/077384, English Translation of Written Opinion dated Jun. 29, 2017, 4 pages.

* cited by examiner

METHOD, APPARATUS, AND SYSTEM FOR ESTABLISHING SESSION

CROSS-REFERENCE TO RELATED APPLICATIONS

This application is a U.S. National Stage of International Patent Applications No. PCT/CN2017/077384 filed on Mar. 20, 2017, which is hereby incorporated by reference in its entirety.

TECHNICAL FIELD

Embodiments of the present invention relate to the field of communications technologies, and in particular, to a method, an apparatus, and a system for establishing a session.

BACKGROUND

In a 5th Generation (5G) mobile communications technology, a PDU session used to provide a protocol data unit (PDU) connectivity service exists between user equipment (UE) and a data network (DN). Usually a session and service continuity mode used by the PDU session is a session and service continuity mode (SSC mode) 1 and an SSC mode 2.

FIG. 1a shows a procedure for establishing a session in SSC mode 1. To be specific, a network side (for example, a session management function (SMF) entity releases a PDU session and instructs UE to immediately establish a new PDU session to a same DN; and then when the SMF entity receives a first message sent by the UE, the SMF entity selects a new user plane function (UPF) entity to implement establishment of the PDU session. In other words, when a session is established in SSC mode 1, because one UPF entity corresponds to one IP address, not only the UPF entity may change, but also the IP address may change. FIG. 1b shows a procedure for establishing a session in SSC mode 2. An SMF entity instructs UE to establish a new PDU session within a preset time; then when receiving a first message sent by the UE, the SMF entity selects a new SMF entity and establishes the new PDU session; and finally the SMF releases an old PDU session after the preset time.

However, in the prior art, because the first message sent by the UE is sent to the SMF entity by using a mobility management function (AMF) entity, the AMF entity performs a process of selecting an SMF entity again when the AMF entity forwards the first message, and the newly selected SMF entity also performs a process of selecting a UPF entity. Consequently, processing efficiency is relatively low. In addition, if the SMF entity selected by the AMF entity and the SMF entity triggered to re-establish the PDU session are not a same SMF entity, the UPF selected by the newly selected SMF entity and the UPF entity selected by the SMF entity triggered to re-establish the PDU session are inconsistent. Consequently, optimization of a user plane cannot be ensured after the PDU session is re-established.

SUMMARY

This application provides a method, an apparatus, and a system for establishing a session, to resolve a problem in the prior art that efficiency is low because an AMF entity needs to reselect an SMF entity when forwarding a first message.

To achieve the foregoing objectives, the following technical solutions are used in this application:

According to a first aspect, an embodiment of the present invention provides a method for establishing a session, where the method includes: establishing, by user equipment UE, a first session by using a session management function SMF entity; receiving, by the UE, a first message sent by a mobility management function AMF entity, where the first message is used to instruct the UE to send a request for establishing a second session; allocating, by the UE, an identifier same as an identifier of the first session to the second session: and sending, by the UE to the AMF entity, a second message used by the UE to request to establish the second session, where the second message carries the identifier of the second session, and the identifier of the second session is used to instruct the AMF entity to send the second message to the SMF entity.

In the method for establishing a session according to this embodiment of the present invention, the identifier information is carried in the second message, and then the AMF entity sends, based on the identifier information, the second message to the SMF entity specified by the identifier information. This is because a purpose of triggering, by the SMF entity, the user equipment to send the second message is to re-establish a session. However, in a system for establishing a session, the second message sent by the user equipment can be forwarded to the SMF entity only by the AMF entity, and when forwarding the second message, the AMF entity needs to perform a process of selecting an SMF entity. Therefore, in this embodiment of the present invention, the identifier information may be used to avoid a problem that processing efficiency is low because the AMF entity needs to perform the process of selecting an SMF entity again when receiving the second message, and avoid a problem that the SMF entity selected by the AMF entity is inconsistent with the SMF entity that triggers the user equipment to send the second message. Further, in this embodiment of the present invention, the identifier information may be used to enable the SMF entity not to perform a process of reselecting a UPF entity again after the SMF entity receives the identifier information. The reason is that the SMF entity triggers the UE to send the second message usually because the SMF entity has determined, before triggering the UE to send the second message, that a UPF entity (for example, a first UPF entity) establishing a session with the UE at this time already cannot satisfy a user requirement, and has selected an appropriate UPF entity (for example, the first UPF entity) to re-establish the second session with the UE. This can further optimize a user plane finally after the second session is established.

With reference to the first aspect, in a first possible implementation of the first aspect, the first message carries first indication information used to instruct the UE to allocate the identifier same as the identifier of the first session to the second session, and the allocating, by the UE, an identifier same as an identifier of the first session to the second session includes: allocating, by the UE, the identifier same as the identifier of the first session to the second session according to the first indication information.

With reference to the first aspect or the first possible implementation of the first aspect, in a second possible implementation of the first aspect, the allocating, by the UE, an identifier same as an identifier of the first session to the second session includes: obtaining, by the UE, a session and service continuity mode of the first session; and determining, by the UE, that the session and service continuity mode of the first session is a first mode, and allocating the identifier same as the identifier of the first session to the second session.

With reference to any one of the first aspect to the second possible implementation of the first aspect, in a third possible implementation of the first aspect, the first message carries identifier information, and the identifier information is used by the AMF entity to send the second message to the SMF entity; and the second message carries the identifier information. Specifically, the AMF entity stores a correspondence between the identifier information and the SMF entity.

With reference to any one of the first aspect to the third possible implementation of the first aspect, in a fourth possible implementation of the first aspect, the first message carries second indication information used to indicate that a data network DN of the second session is the same as a DN of the first session.

According to a second aspect, an embodiment of the present invention provides a method for establishing a session, where the method includes: establishing, by user equipment UE, a first session by using a session management function SMF entity; receiving, by the UE, a first message sent by a mobility management function AMF entity and used to instruct the UE to send a request for establishing a second session: and sending, by the UE, a second message to the AMF entity, where the second message is used to request to establish the second session, and the first message carries identifier information used to instruct the AMF entity to send the second message to the SMF entity associated with the identifier information.

With reference to the second aspect, in a first possible implementation of the second aspect, the first message carries third indication information used to instruct the UE to add the identifier information to the second message. Specifically, after receiving the third indication information, the UE adds the identifier information to the second message.

With reference to the second aspect or the first possible implementation of the second aspect, in a second possible implementation of the second aspect, the UE obtains a session and service continuity mode of the first session, the UE determines that the session and service continuity mode of the first session is a second mode, and the UE determines an identifier of the first session as the identifier information. The second mode is a session and service continuity mode SSC 2, the SSC 2 indicates that a network side allows the UE to first establish the second session before the first session is released, and a data network DN of the second session is the same as a DN of the first session. In SSC 2, the first session and the first session coexist for a period of time.

With reference to any one of the second aspect to the second possible implementation of the second aspect, in a third possible implementation of the second aspect, the UE receives, by using the AMF entity, the identifier information configured by the SMF entity.

With reference to any one of the second aspect to the third possible implementation of the second aspect, in a fourth possible implementation of the second aspect, the first message carries fourth indication information, the fourth indication information is used to instruct the UE to use an identifier of the first session as the identifier information, and the user equipment determines the identifier of the first session as the identifier information according to the fourth indication information. To be specific, the second message used by the UE to request to establish the second session carries at least the identifier of the first session. For example, the second message carries both an identifier of the second session and the identifier of the first session.

With reference to any one of the second aspect to the fourth possible implementation of the second aspect, in a fifth possible implementation of the second aspect, the first message carries second indication information used to instruct the UE to establish the second session to the same data network DN as the first session.

According to a third aspect, an embodiment of the present invention provides a method for establishing a session, where the method includes: sending, by a mobility management function AMF entity to user equipment UE, a first message used to instruct the UE to send a request for establishing a second session; receiving, by the mobility management function AMF entity, a second message sent by the user equipment and carrying identifier information, where the identifier information is used to instruct the AMF entity to send the second message to a session management function SMF entity associated with the identifier information, and the second message is used to request to establish the second session; and sending, by the AMF entity, the second message to the SMF entity based on the identifier information.

With reference to the third aspect, in a first possible implementation of the third aspect, the first message carries third indication information used to instruct the UE to add the identifier information to the second message.

With reference to the third aspect or the first possible implementation of the third aspect, in a second possible implementation of the third aspect, the identifier information is configured by the SMF entity, before the sending, by an AMF entity, a first message to UE, the method provided by this embodiment of the present invention further includes: receiving, by the AMF entity, a first request message sent by the SMF entity and used to instruct the AMF entity to establish a mapping relationship between the identifier information and an identifier of the SMF entity; and sending, by the AMF entity based on the identifier information, the second message to the SMF entity associated with the identifier information includes: obtaining, by the AMF entity based on the identifier information, the identifier of the SMF entity corresponding to the identifier information; and sending, by the AMF entity, the second message to the SMF entity indicated by the identifier of the SMF entity corresponding to the identifier information.

With reference to any one of the third aspect to the second possible implementation of the third aspect, in a third possible implementation of the third aspect, before the sending, by a mobility management function AMF entity, a first message to user equipment UE, the method provided by this embodiment of the present invention further includes: receiving, by the AMF entity, a first request message sent by the SMF entity and used to instruct the AMF entity to store a mapping relationship between an identifier of the first session and the SMF entity, where the first session is a session established between the SMF entity and the UE before the SMF entity sends the first request message; and storing, by the AMF entity, the mapping relationship between the identifier of the first session and the SMF entity based on the first request message.

With reference to any one of the third aspect to the third possible implementation of the third aspect, in a fourth possible implementation of the third aspect, the first message further carries first indication information used to instruct the UE to allocate an identifier same as the identifier of the first session to the second session, and the identifier information is the identifier of the second session.

With reference to any one of the third aspect to the fourth possible implementation of the third aspect, in a fifth possible implementation of the third aspect, the first message carries fourth indication information used to instruct the UE to use an identifier of the first session as the identifier information.

With reference to any one of the third aspect to the fifth possible implementation of the third aspect, in a sixth possible implementation of the third aspect, the first message carries second indication information used to instruct the UE to establish the second session to a same data network DN as the first session.

According to a fourth aspect, an embodiment of the present invention provides a method for establishing a session, where the method includes: sending, by a session management function SMF entity to a mobility management function AMF entity, a first request message used to instruct the AMF entity to send a first message to user equipment UE, where the first message is used to instruct the UE to send a second message for establishing a second session: receiving, by the session management function SMF entity, the second message sent by the mobility management function AMF entity and used to instruct to establish the second session; and establishing, by the SMF entity, the second session between the SMF entity and the user equipment UE based on the second message.

With reference to the fourth aspect, in a first possible implementation of the fourth aspect, the first message carries third indication information used to instruct the UE to add identifier information to the second message.

With reference to the fourth aspect or the first possible implementation of the fourth aspect, in a second possible implementation of the fourth aspect, before the sending, by a session management function SMF entity, a first request message to an AMF entity, the method provided by this embodiment of the present invention further includes: configuring, by the SMF entity, identifier information used to instruct the AMF entity to send the second message to the SMF entity, where the first request message is further used to instruct the AMF entity to establish a mapping relationship between the identifier information and an identifier of the SMF entity.

With reference to any one of the fourth aspect to the second possible implementation of the fourth aspect, in a third possible implementation of the fourth aspect, the first request message is further used to instruct the AMF entity to establish a relationship between an identifier of the first session and the SMF entity, the second message further carries third indication information used to instruct the UE to allocate a same session identifier to the first session and the second session, identifier information is an identifier of the second session, and the first session is a session established between the SMF entity and the UE before the SMF entity sends the first request message.

With reference to any one of the fourth aspect to the third possible implementation of the fourth aspect, in a fourth possible implementation of the fourth aspect, the first message carries fourth indication information used to instruct the UE to use an identifier of the first session as identifier information, and the identifier information is the identifier of the first session.

With reference to any one of the fourth aspect to the fourth possible implementation of the fourth aspect, in a fifth possible implementation of the fourth aspect, the first message further carries second indication information used to instruct the UE to establish the second session to a same data network DN as the first session.

According to a fifth aspect, an embodiment of the present invention provides user equipment, including: an establishing unit, configured to establish a first session by using a session management function SMF entity; a receiving unit, configured to receive a first message sent by a mobility management function AMF entity and used to instruct the user equipment UE to send a request for establishing a second session; an allocation unit, configured to allocate an identifier same as an identifier of the first session to the second session: and a sending unit, configured to send, to the AMF entity, a second message used to indicate that the UE requests to establish the second session, where the second message carries the identifier of the second session, and the identifier of the second session is used to instruct the AMF entity to send the second message to the SMF entity.

With reference to the fifth aspect, in a first possible implementation of the fifth aspect, the first message carries first indication information used to instruct the UE to allocate the identifier same as the identifier of the first session to the second session, and the allocation unit is specifically configured to allocate the identifier same as the identifier of the first session to the second session according to the first indication information.

With reference to the fifth aspect or the first possible implementation of the fifth aspect, in a second possible implementation of the fifth aspect, the user equipment further includes an obtaining unit, configured to obtain a session and service continuity mode of the first session: and the allocation unit is specifically configured to determine that the session and service continuity mode of the first session is a first mode, and allocate the identifier same as the identifier of the first session to the second session as identifier information.

According to a sixth aspect, an embodiment of the present invention provides user equipment, including: an establishing unit, configured to establish a first session by using a session management function SMF entity; a receiving unit, configured to receive a first message sent by a mobility management function AMF entity and used to instruct the user equipment UE to send a request for establishing a second session; and a sending unit, configured to send, to the AMF entity, a second message used to instruct to establish the second session, where the first message carries identifier information used to instruct the AMF entity to send the second message to the SMF entity associated with the identifier information.

With reference to the sixth aspect, in a first possible implementation of the sixth aspect, the user equipment further includes: an obtaining unit, configured to obtain a session and service continuity mode of the first session; and a determining unit, configured to determine that the session and service continuity mode of the first session is a second mode, and determine an identifier of the first session as the identifier information.

With reference to the sixth aspect or the first possible implementation of the sixth aspect, in a second possible implementation of the sixth aspect, the user equipment further includes: a determining unit, configured to determine that the first message carries fourth indication information used to instruct the UE to use an identifier of the first session as the identifier information, determine the identifier of the first session as the identifier information, and add the identifier information to the second message, where the fourth indication information is used to instruct the UE to use the identifier of the first session as the identifier information.

With reference to the sixth aspect to the second possible implementation of the sixth aspect, in a third possible implementation of the sixth aspect, the receiving unit is further configured to receive, by using the AMF entity, the identifier information configured by the SMF entity.

With reference to any one of the sixth aspect to the third possible implementation of the sixth aspect, in a fourth possible implementation of the sixth aspect, the first message carries second indication information used to instruct the UE to establish the second session to a same data network DN as the first session.

According to a seventh aspect, an embodiment of the present invention provides a mobility management function AMF entity, including: a sending unit, configured to send, to user equipment UE, a first message used to instruct the UE to send a request for establishing a second session: and a receiving unit, configured to receive a second message sent by the user equipment and carrying identifier information, where the identifier information is used to instruct the AMF entity to send the second message to a session management function SMF entity associated with the identifier information, and the second message is used to instruct to establish the second session, where the sending unit is configured to send, based on the identifier information, the second message to the SMF entity associated with the identifier information.

With reference to the seventh aspect, in a first possible implementation of the seventh aspect, the first message carries third indication information used to instruct the UE to add the identifier information to the second message.

With reference to the seventh aspect or the first possible implementation of the seventh aspect, in a second possible implementation of the seventh aspect, the identifier information is configured by the SMF entity, and the receiving unit is further configured to receive a first request message sent by the SMF entity and used to instruct the AMF entity to establish a mapping relationship between the identifier information and an identifier of the SMF entity; the AMF entity further includes an establishing unit, configured to establish the mapping relationship between the identifier information and the identifier of the SMF entity based on the first request message; the AMF entity further includes an obtaining unit, configured to obtain, based on the identifier information, the identifier of the SMF entity corresponding to the identifier information; and the sending unit is specifically configured to send the second message to the SMF entity associated with the identifier of the SMF entity.

With reference to any one of the seventh aspect to the second possible implementation of the seventh aspect, in a third possible implementation of the seventh aspect, the receiving unit is further configured to receive a first request message sent by the SMF entity and used to instruct the AMF entity to store a mapping relationship between an identifier of the first session and an identifier of the SMF entity, where the first session is a session established between the SMF entity and the UE before the SMF entity sends the first request message; and the AMF entity further includes a storage unit, configured to store a mapping relationship between the identifier of the first session and the SMF entity based on the first request message.

According to an eighth aspect, an embodiment of the present invention provides a session management function SMF entity, including: a sending unit, configured to send, to a mobility management function AMF entity, a first request message used to instruct the AMF entity to send a first message to user equipment UE, where the first message is used to instruct the UE to send a second message for establishing a second session; a receiving unit, configured to receive the second message sent by the mobility management function AMF entity and used to instruct to establish the second session: and an establishing unit, configured to establish the second session between the SMF entity and the user equipment UE based on the second message.

With reference to the eighth aspect, in a first possible implementation of the eighth aspect, the first message carries third indication information used to instruct the UE to add identifier information to the second message.

With reference to the eighth aspect or the first possible implementation of the eighth aspect, in a second possible implementation of the eighth aspect, the SMF entity further includes: a configuration unit, configured to configure identifier information used to instruct the AMF entity to send the second message to the SMF entity, where the first request message is further used to instruct the AMF entity to establish a mapping relationship between the identifier information and the SMF entity.

According to a ninth aspect, an embodiment of the present invention provides a mobility management function AMF entity, including a memory, a processor, a bus, and a transceiver, where the memory stores code and data, the processor is connected to the memory by the bus, and the processor runs the code in the memory so that the AMF entity performs the method for establishing a session according to any one of the third aspect to the sixth possible implementation of the third aspect.

According to a tenth aspect, an embodiment of the present invention provides a session management function SMF entity, including a memory, a processor, a bus, and a transceiver, where the memory stores code and data, the processor is connected to the memory by the bus, and the processor runs the code in the memory so that the SMF entity performs the method for establishing a session according to any one of the fourth aspect to the fifth possible implementation of the fourth aspect.

According to an eleventh aspect, an embodiment of the present invention provides user equipment, including a memory, a processor, a bus, and a transceiver, where the memory stores code and data, the processor is connected to the memory by the bus, and the processor runs the code in the memory so that the user equipment performs the method for establishing a session according to any one of the first aspect to the fourth possible implementation of the first aspect or the method for establishing a session according to any one of the second aspect to the fourth possible implementation of the second aspect.

According to a twelfth aspect, an embodiment of the present invention provides a computer-readable storage medium, including an instruction, where when the instruction runs on an AMF entity, the AMF entity is enabled to perform the method for establishing a session according to any one of the third aspect to the sixth possible implementation of the third aspect, or when the instruction is executed on an SMF entity, the SMF entity is enabled to perform the method for establishing a session according to any one of the fourth aspect to the fifth possible implementation of the fourth aspect, or when the instruction runs on user equipment, the user equipment is enabled to perform the method for establishing a session according to any one of the first aspect to the fourth possible implementation of the first aspect or the method for establishing a session according to any one of the second aspect to the fourth possible implementation of the second aspect.

According to a thirteenth aspect, an embodiment of the present invention provides a system for establishing a session, where the system includes the AMF entity according to any one of the seventh aspect to the third possible implementation of the seventh aspect, the SMF entity according to any one of the eighth aspect to the second possible implementation of the eighth aspect, and the user equipment according to any one of the fifth aspect to the second possible implementation of the fifth aspect or the user equipment according to any one of the sixth aspect to the fourth possible implementation of the sixth aspect.

DESCRIPTION OF EMBODIMENTS

To clearly describe the technical solutions of the embodiments of the present invention, terms such as "first" and "second" are used in the embodiments of the present invention to distinguish between same items or similar items that have basically the same functions or purposes. A person skilled in the art may understand that the terms such as "first" and "second" do not limit a quantity or an execution sequence.

Figure 1A:
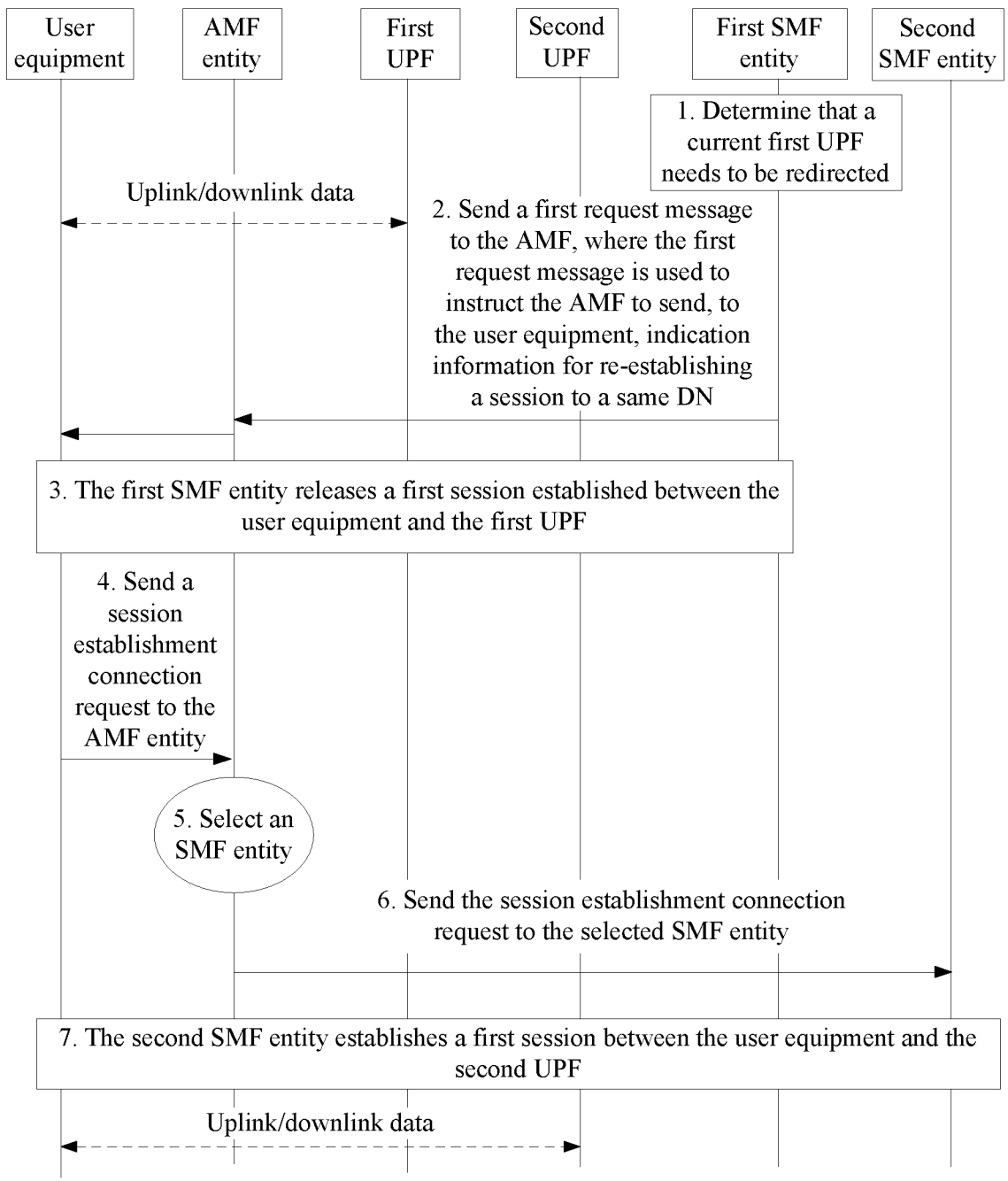
FIG. 1a is a first schematic flowchart of a method for establishing a session according to the prior art.
Figure 1B:
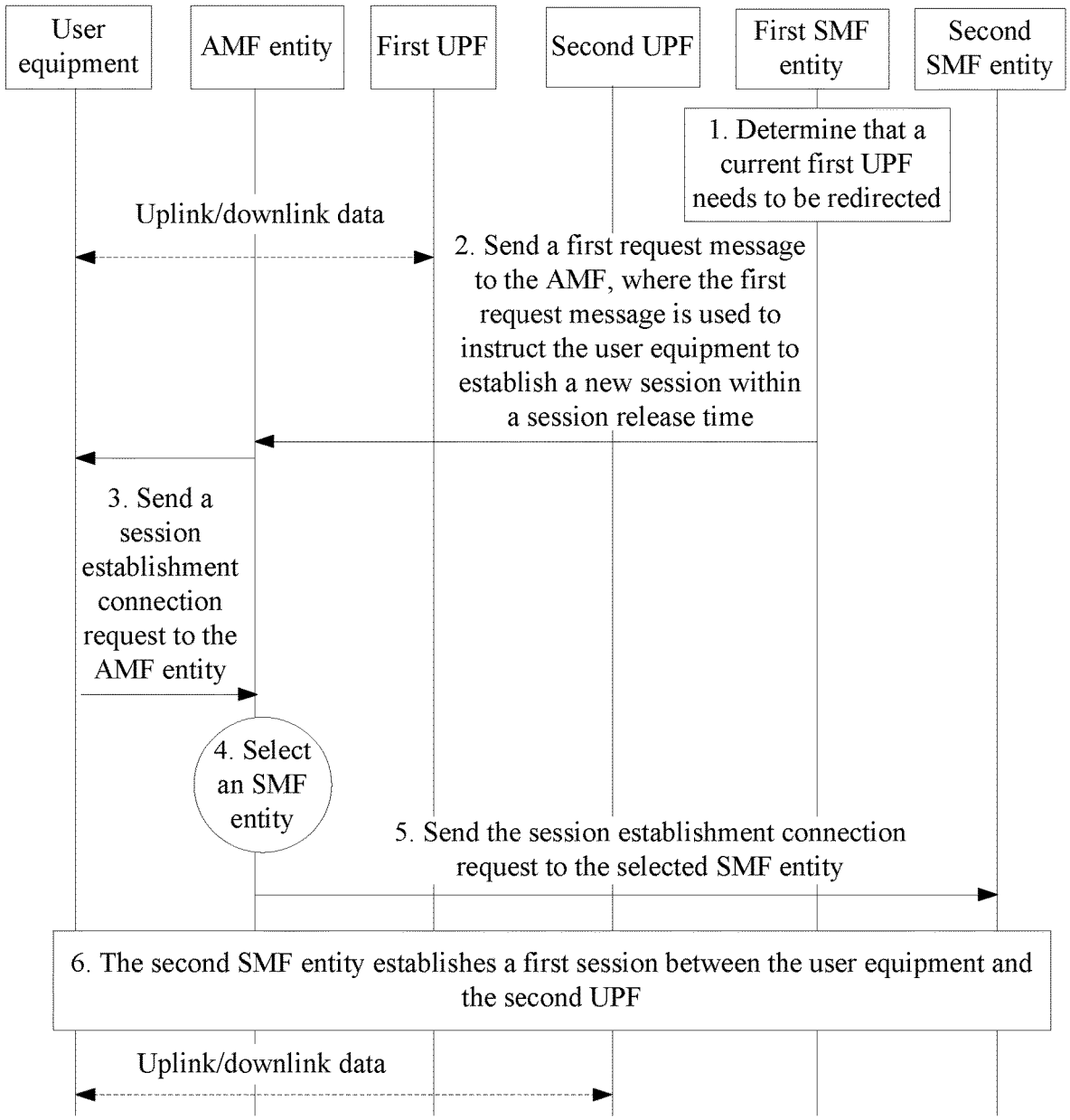
FIG. 1b is a second schematic flowchart of a method for establishing a session according to the prior art.

It should be noted that, a session and service continuity mode 1 in the embodiments of the present invention indicates that when an SMF entity determines that a UPF entity needs to be reselected to establish a new session, the SMF entity first releases a first session established between user equipment and a first UPF entity, as shown in FIG. 1a, and then the SMF entity immediately sends, to the user equipment by using an AMF entity, a request message (for example, a first message shown in FIG. 1a) used to instruct to re-establish a session. Finally, the SMF entity establishes a second session between the user equipment and a second UPF entity based on a session establishment connection request (for example, a second message in the following embodiment) sent by the user equipment, and finally sends data by using the second UPF entity serving the second session. In other words, the first session has been released by the SMF entity before the second session is established.

A session and service continuity mode 2 indicates that when an SMF entity determines that a UPF entity needs to be reselected to establish a new session, the SMF entity first sends a first message to user equipment by using an AMF entity, where the first message is used to instruct the user equipment to send a session establishment connection request (for example, a second message) within a preset time so that the SMF entity establishes a second session between a second UPF entity and the user equipment by using the second UPF entity; and the SMF entity releases a first session after the preset time, that is, a first session established between a first UPF entity and the user equipment. In other words, the first session is released by the SMF entity after the preset time after establishment of the second session.

It should be noted that, a first mode in the embodiments of the present invention is the session and service continuity mode 1, that is, the SSC 1, and a second session and service continuity mode is the session and service continuity mode 2, that is, the SSC 2.

The SSC 1 indicates that a network side may trigger releasing of the first session and instruct the UE to immediately establish the second session, and a data network DN of the second session is the same as a DN of the first session. In SSC 1, the first session is released first, and then the second session is established.

The SSC 2 indicates that the network side may trigger the UE to establish the second session, and the data network DN of the second session is the same as the DN of the first session. In SSC 2, the second session is established first, and then the first session is released.

However, in the prior art, regardless of whether the SMF entity establishes the session between the user equipment and the UPF entity in session and service continuity mode 1 or session and service continuity mode 2, the session establishment connection request needs to be forwarded to the SMF entity by the AMF entity. Therefore, a problem that the AMF entity selects an SMF entity exists. Consequently, not only processing efficiency is low, but also a problem that the newly selected SMF entity reselects a UPF entity when the newly selected SMF entity is inconsistent with the SMF entity triggering re-establishment of a session exists. For example, the first SMF entity triggers the user equipment to send the session establishment connection request (before the first SMF entity triggers the user equipment to send the session establishment connection request, the second UPF entity has been selected to serve the user equipment, and the second UPF entity is a UPF entity that can improve a user plane function and is selected by the first SMF entity for the user equipment based on a location of the user equipment, a feature of sent data, and a location of the second UPF entity), and the session establishment connection request is forwarded by the AMF entity to the SMF entity. Therefore, the AMF entity may send the session establishment connection request to the second SMF entity. Therefore, the second SMF entity reselects a UPF entity after receiving the session establishment connection request. The UPF entity reselected by the second SMF entity may be a third UPF entity, or may be the first UPF entity, and therefore is inconsistent with the UPF entity that the first SMF entity expects to serve the user equipment.

In conclusion, in the embodiments of the present invention, identifier information is carried in a session establishment connection request (that is, a second message), so that an AMF entity can forward, based on the identifier information after receiving the session establishment connection request sent by user equipment, the session establishment connection request to an SMF entity that triggers the user equipment to send the session establishment connection request. In this way, a problem of low efficiency because the AMF entity reselects an SMF entity and the SMF entity reselects a UPF entity is avoided.

Figure 2A:
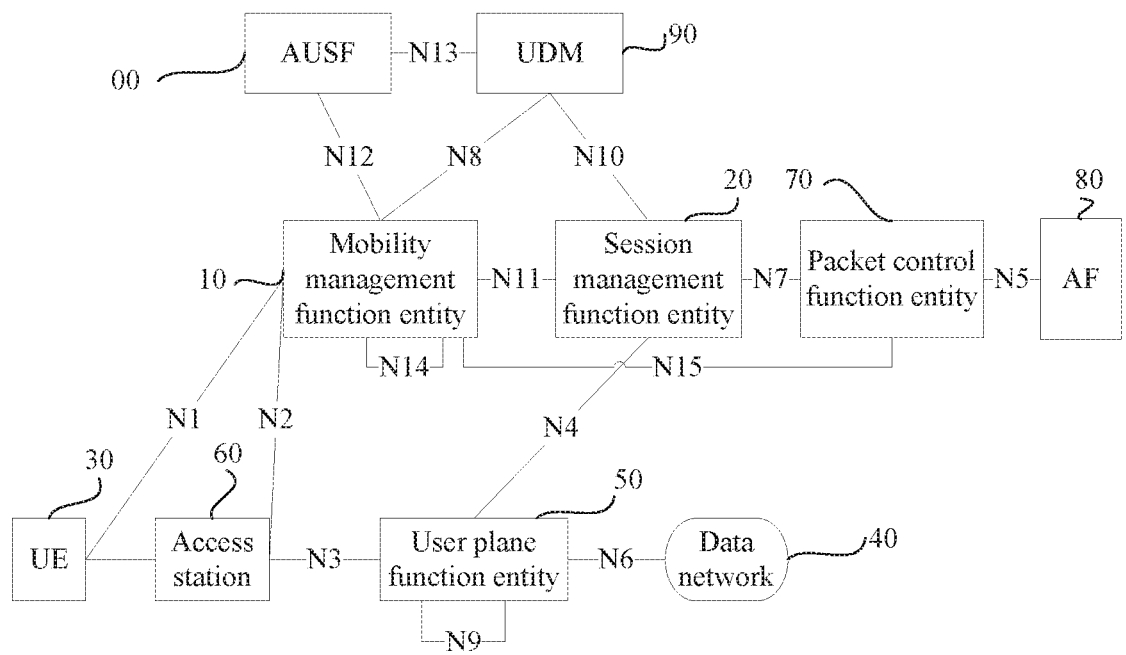
FIG. 2a is an architectural diagram of a system to which a method for establishing a session is applied according to an embodiment of the present invention.

FIG. 2a is an architectural diagram of a system to which a method for establishing a session is applied according to an embodiment of the present invention. The system includes a mobility management function AMF entity 10, one or more session management function SMF entities 20, one or more user equipments UEs 30, a data network (DN) 40, one or more user plane function entities 50, an access station ((Radio) Access Node, (radio) access station) 60, a packet control function (PCF) entity 70, an application function (AF) entity 80, a unified data management (Unified Data Management, UDM) entity 90 configured to store user subscription information, and an authentication server function (AUSF) entity 00.

The mobility management function AMF entity 10 is configured to select an SMF entity based on a session connection establishment request sent by the UE 30, so that the selected SMF entity establishes a session between the UE 30 and the UPF entity 50. The AMF entity 10 is further configured to forward a first message sent by the SMF entity to the user equipment, where the first message is used to instruct the user equipment to send a second message (for example, a session connection establishment request message) for requesting to establish a second session, and the second message is used to instruct to establish the second session. Therefore, after receiving the second message, the SMF entity may establish the second session between the UE 30 and the UPF entity based on the second message.

Optionally, the AMF entity 10 stores a mapping relationship between an identifier of a session and an SMF entity establishing the session, and is configured to establish, based on identifier information configured by the SMF entity, a mapping relationship between the identifier information and the SMF entity.

The SMF entity 20 is configured to reallocate a UPF to the UE based on location information of the UE 30 or a feature of data sent by the UE 30 or a location between the UPF 50 and the UE 30, and quality of service of the UPF, to re-establish a session between the UE and the newly allocated UPF, so that a user plane can be optimized after the session is re-established. The SMF entity 20 is further configured to configure identifier information, where the identifier information is used to instruct the AMF entity to send the second message to the SMF entity. The session management function entity 20 is further configured to establish a session between the UE 30 and the UPF entity 50, for example, a protocol data unit (PDU) session, where the PDU session is used to connect the UE 30 to the DN 40, and the PDU session is used to provide a PDU data packet.

A plurality of user equipments UEs 30 are configured to communicate with the DN based on established sessions.

The data network DN 40 is an external network configured to provide a data service.

The access station 60 is configured to provide a data service for the UE 30, for example, receiving data sent by the UE 30, or sending data to the UE 30. In an actual use process, the access station 60 may be a base station. In this embodiment of the present invention, a base station (BS) may be a device that communicates with user equipment (UE) or another communications station such as a relay station, and the base station may provide communication coverage in a specific physical area.

The PCF entity 70 is configured to serve as an interface between a radio frequency part and a packet network (IP network).

The AF entity 80 has a function of an application and is configured to affect routing.

For example, as shown in FIG. 2a, the AMF entity 10 communicates with the SMF entity 20 by using an interface N11. The AMF entity 10 communicates with the UE 30 by using the interface N1. The AMF entity 10 communicates with the access station 60 by using an interface N2. The AMF entity 10 communicates with the AUSF entity 00 by using an interface N12. The AMF entity 10 communicates with the UDM entity by using an interface N8. The AMF entity 10 communicates with the PCF entity by using an interface N15. The SMF entity 20 communicates with the UDM entity 90 by using an interface N10. The SMF entity 20 communicates with the UPF entity 50 by using an interface N4. The UPF entity 50 communicates with the data network 40 by using an interface N6. The PCF entity communicates with the AF entity by using an interface N5.

Figure 2B:
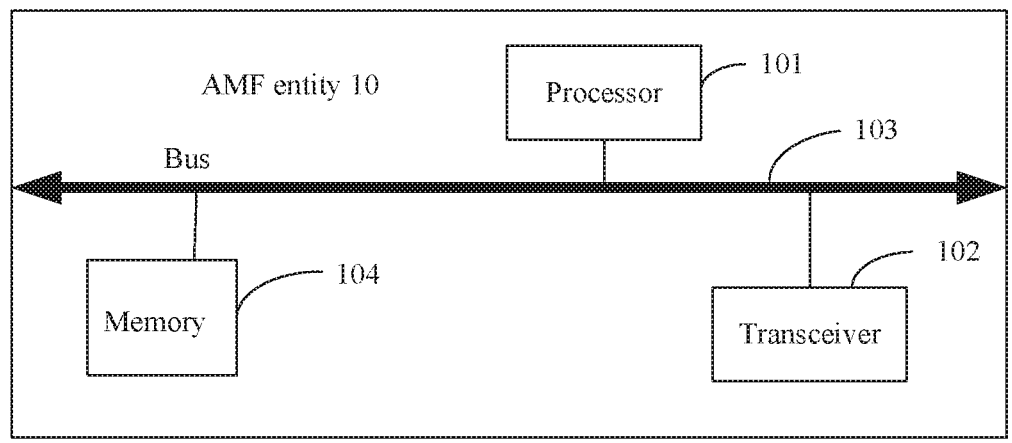
FIG. 2b is a schematic structural diagram of an AMF entity according to an embodiment of the present invention.

FIG. 2b is a schematic structural diagram of an AMF entity according to an embodiment of the present invention. As can be learned from FIG. 2b, the AMF entity 10 includes a processor 101, a transceiver 102, a memory 104, and a bus 103. The transceiver 102, the processor 101, and the memory 104 are interconnected by the bus 103. The bus 103 may be a PCI bus or an EISA bus, or the like. The bus may be classified into an address bus, a data bus, a control bus, and the like. For ease of indication, the bus is indicated by using only one thick line in FIG. 2b. However, it does not mean that there is only one bus or only one type of bus. The memory 104 is configured to store program code and data of the AMF entity 10. The transceiver 102 is configured to support the AMF entity 10 in communicating with another device. The processor 101 is configured to support the AMF entity 10 in executing the program code and data stored in the memory 104 to implement a method for establishing a session according to an embodiment of the present invention.

Figure 2C:
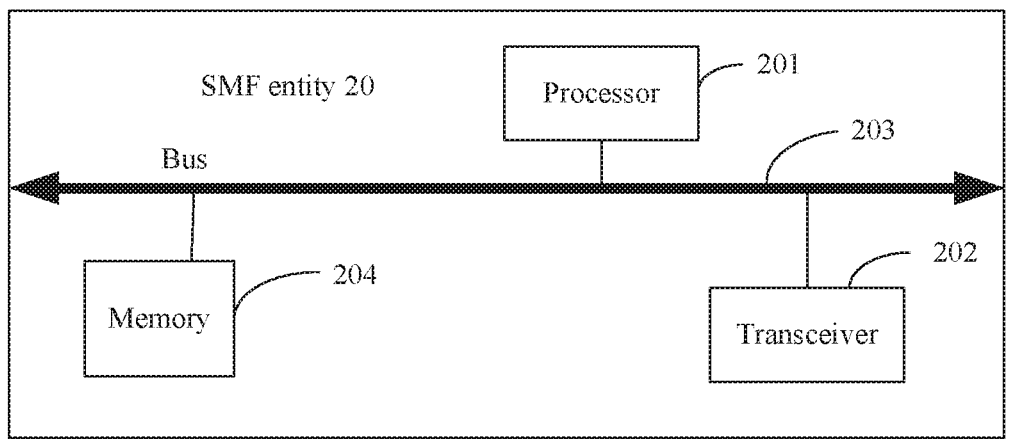
FIG. 2c is a schematic structural diagram of an SMF entity according to an embodiment of the present invention.

FIG. 2c is a schematic structural diagram of an SMF entity according to an embodiment of the present invention. As can be learned from FIG. 2c, the SMF entity 20 includes a processor 201, a transceiver 202, a memory 204, and a bus 203. The transceiver 202, the processor 201, and the memory 204 are interconnected by the bus 203. The bus 203 may be a PCI bus or an EISA bus, or the like. The bus may be classified into an address bus, a data bus, a control bus, and the like. For ease of indication, the bus is indicated by using only one thick line in FIG. 2c. However, it does not mean that there is only one bus or only one type of bus. The memory 204 is configured to store program code and data of the SMF entity 20. The transceiver 202 is configured to support the SMF entity 20 in communicating with another device. The processor 201 is configured to support the SMF entity 20 in executing the program code and data stored in the memory 204 to implement a method for establishing a session according to an embodiment of the present invention.

Figure 2D:
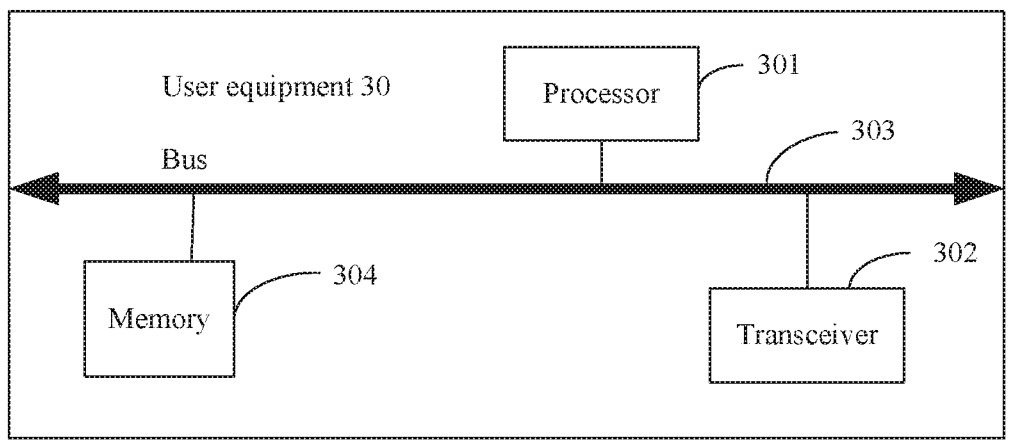
FIG. 2d is a schematic structural diagram of UE according to an embodiment of the present invention.

FIG. 2d is a schematic structural diagram of user equipment according to an embodiment of the present invention. As can be learned from FIG. 2d, the user equipment 30 includes a processor 301, a transceiver 302, a memory 304, and a bus 303. The transceiver 302, the processor 301, and the memory 304 are interconnected by the bus 303. The bus 303 may be a PCI bus or an EISA bus, or the like. The bus may be classified into an address bus, a data bus, a control bus, and the like. For ease of indication, the bus is indicated by using only one thick line in FIG. 2d. However, it does not mean that there is only one bus or only one type of bus. The memory 304 is configured to store program code and data of the user equipment 30. The transceiver 302 is configured to support the user equipment 30 in communicating with another device. The processor 301 is configured to support the user equipment 30 in executing the program code and data stored in the memory 304 to implement a method for establishing a session according to an embodiment of the present invention.

In the embodiments of the present invention, UEs may be distributed in a whole wireless network, and each UE may be motionless or mobile.

The UE may be a terminal (terminal), a mobile station (mobile station), a subscriber unit (subscriber unit), a station (station), or the like. The UE may be a cellular phone (cellular phone), a personal digital assistant (personal digital assistant, PDA), a wireless modem (Modem), a wireless communications device, a handheld (handheld) device, a laptop computer (laptop computer), a cordless phone (cordless phone), a wireless local loop (wireless local loop, WLL) station, or the like. When the UE is applied to M2M communication, the UE may be referred to as an M2M terminal, and may be specifically a smart meter or a smart appliance supporting M2M communication, or the like.

Figure 3:
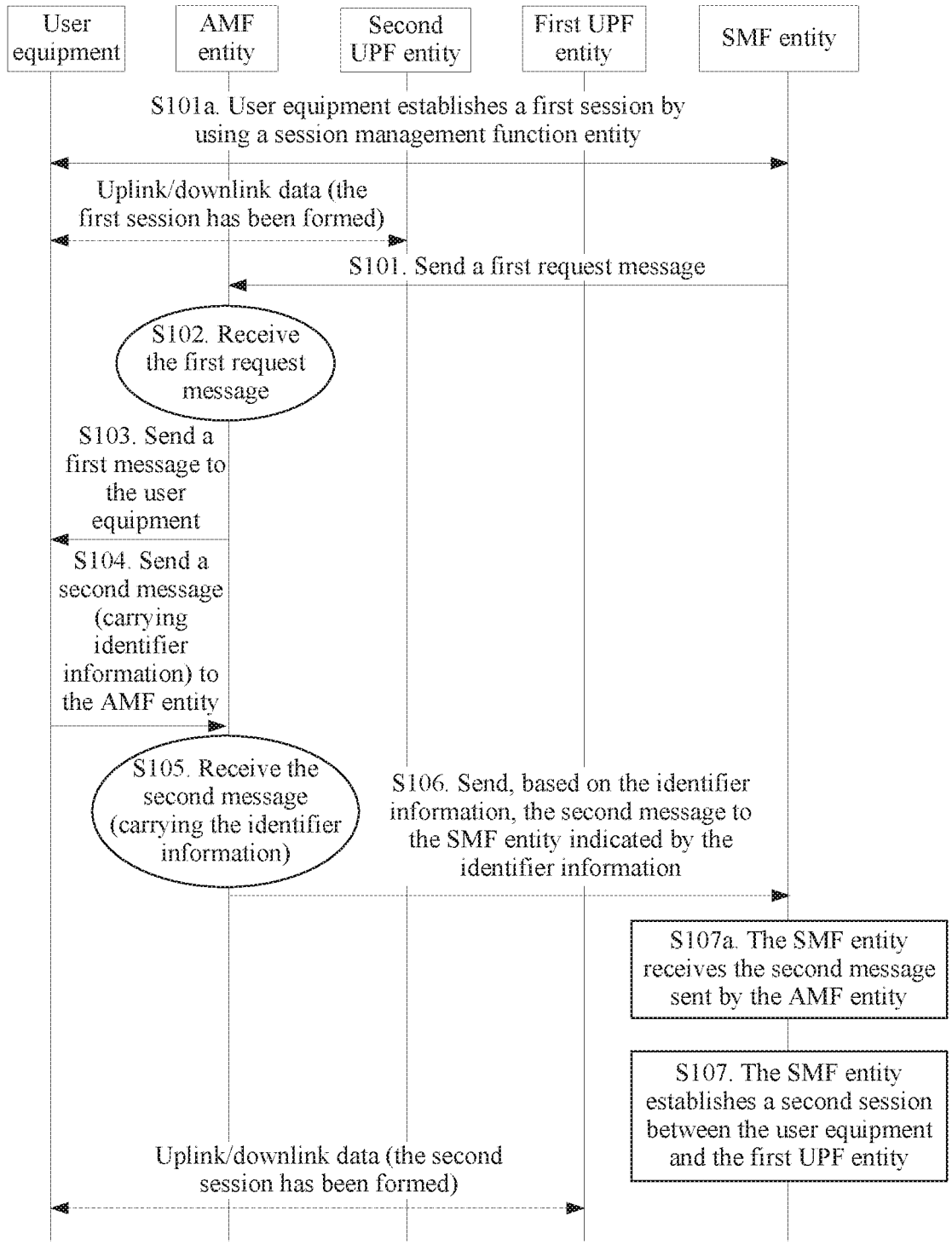
FIG. 3 is a first schematic flowchart of a method for establishing a session according to an embodiment of the present invention.

As shown in FIG. 3, a method for establishing a session according to an embodiment of the present invention includes the following steps.

S101a. User equipment establishes a first session by using a session management function SMF entity.

S101. The session management function SMF entity sends a first request message to a mobility management function AMF entity, where the first request message is used to instruct the AMF entity to send a first message to the user equipment UE, and the first message is used to instruct the UE to send a request for establishing a second session.

The first message in this embodiment of the present invention may be a session release notification message, and the session release notification message is used to instruct the UE to send a second message, that is, a session connection establishment request message.

It may be understood that, when the SMF entity uses different session and service continuity modes to establish a session with the user equipment, content carried in the first message may also be different. For example, if the SMF entity uses a session and service continuity mode 1 to establish a session with the user equipment, the first message carries a session cause value, where the session cause value may be re-establishing the second session; or if the SMF entity uses a session and service continuity mode 2 to establish a session with the user equipment, the first message carries a session release time and identifier information configured by the SMF entity, or the first message carries a session release time and a session release cause value, where the session release cause value may be replacing a UPF entity.

S102. The AMF entity receives the first request message.

S103. The AMF entity sends the first message to the UE, where the first message is used to instruct the UE to send the request for establishing the second session.

S104. The UE sends a second message to the AMF entity, where the second message carries identifier information, the identifier information is used to instruct the AMF entity to send the second message to the SMF entity, and the second message is used to instruct to re-establish the second session.

S105. The AMF entity receives the second message.

S106. The AMF entity sends, based on the identifier information, the second message to the SMF entity associated with the identifier information.

S107a. The SMF entity receives the second message sent by the AMF entity.

S107. The SMF entity re-establishes the second session between the SMF entity and the UE based on the second message by using a first user plane function UPF entity.

In the method for establishing a session according to this embodiment of the present invention, the identifier information is carried in the second message, and then the AMF entity sends, based on the identifier information, the second message to the SMF entity specified by the identifier information. This is because a purpose of triggering, by the SMF entity, the user equipment to send the second message is to re-establish a session. However, in a system for establishing a session, the second message sent by the user equipment can be forwarded to the SMF entity only by the AMF entity, and when forwarding the second message, the AMF entity needs to perform a process of selecting an SMF entity. Therefore, in this embodiment of the present invention, the identifier information may be used to avoid a problem that processing efficiency is low because the AMF entity needs to perform the process of selecting an SMF entity again when receiving the second message, and avoid a problem that the SMF entity selected by the AMF entity is inconsistent with the SMF entity that triggers the user equipment to send the second message. Further, in this embodiment of the present invention, the identifier information may be used to enable the SMF entity not to perform a process of reselecting a UPF entity again after the SMF entity receives the identifier information. The reason is that the SMF entity triggers the UE to send the second message usually because the SMF entity has determined, before triggering the UE to send the second message, that a UPF entity (for example, a first UPF entity) establishing a session with the UE at this time already cannot satisfy a user requirement, and has selected an appropriate UPF entity (for example, the first UPF entity) to re-establish the second session with the UE. This can further optimize a user plane finally after the second session is established.

It may be understood that, a scenario to which this embodiment of the present invention is applied is that the UE and the SMF have established the first session. However, in a data exchange process, the SMF entity determines that a UPF entity providing a service for the first session cannot satisfy a requirement, and selects the appropriate first UPF entity for the UE for establishing the second session.

A session and service continuity mode formed between the UE and the UPF entity may be the session and service continuity mode 1 and the session and service continuity mode 2, but different session and service continuity modes cause content of information sent when the SMF entity communicates with the UE to be different, and occasions on which the SMF entity releases the first session are also different. For example, in session and service continuity mode 1, the SMF entity has released the first session before the second session is established, and in session and service continuity mode 2, the SMF entity releases the first session only after the second session is established and when the session release time arrives.

Therefore, the following describes the method for establishing a session in session and service continuity mode 1 and session and service continuity mode 2 separately.

First, an example in which a first scenario is the session and service continuity mode 1 is used for description.

Figure 4A:
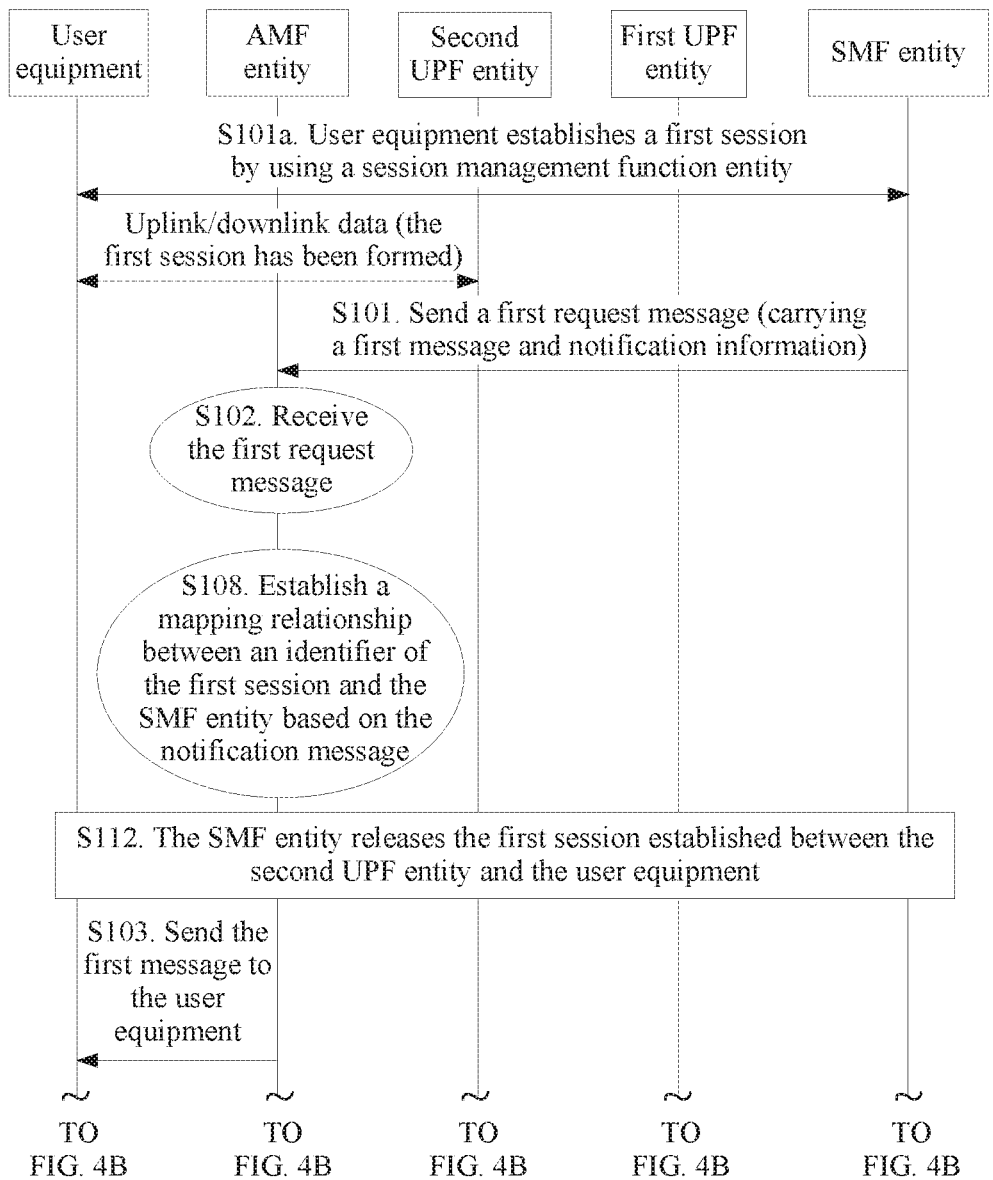
FIG. 4A and FIG. 4B are a second schematic flowchart of a method for establishing a session according to an embodiment of the present invention.
Figure 4B:
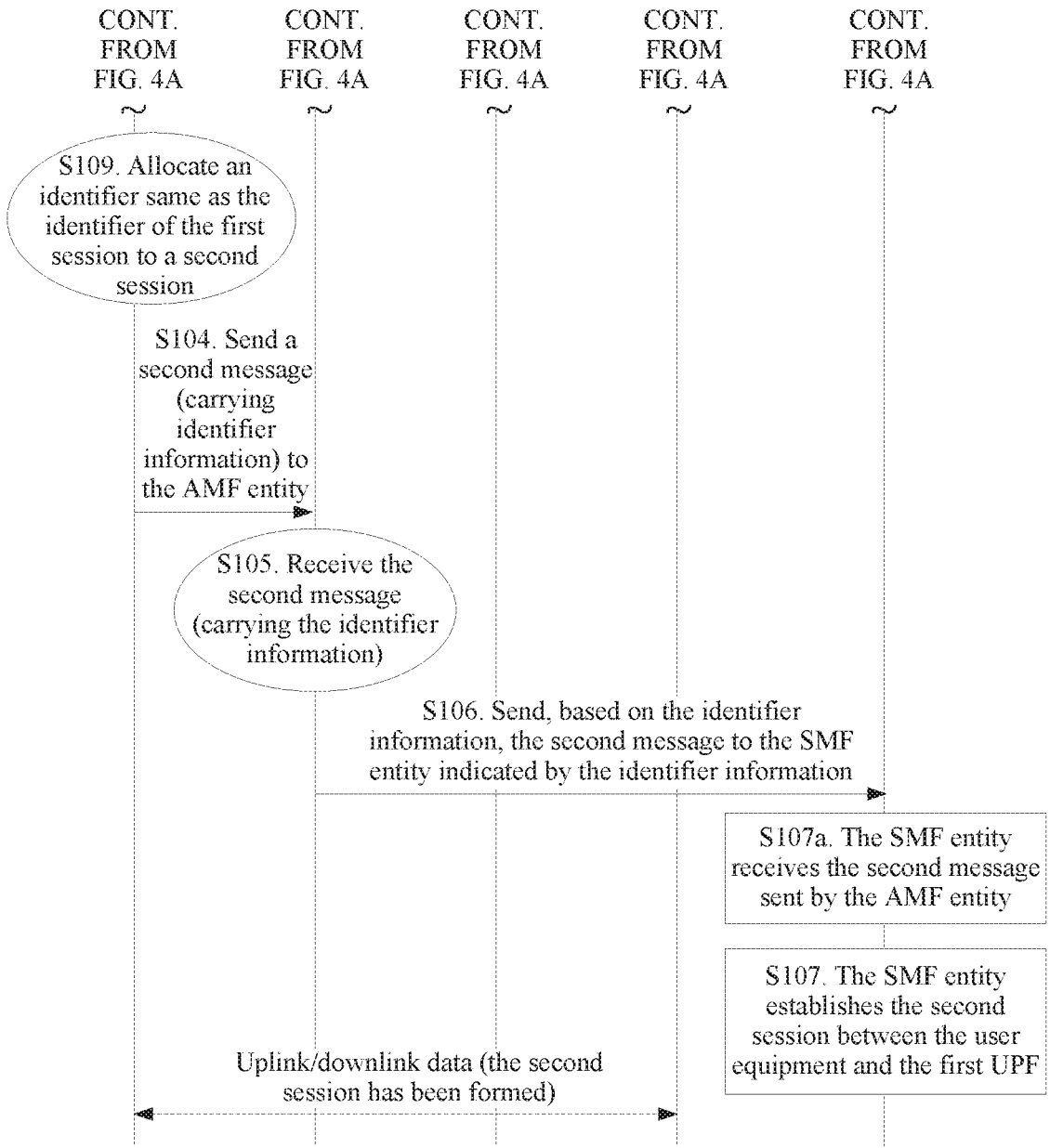

As shown in FIG. 4A and FIG. 4B, the first request message in this embodiment of the present invention is further used to instruct the AMF entity to establish a mapping relationship between an identifier of the SMF entity and an identifier of the first session. Specifically, the first request message carries the first message and a notification message. The first message carries the session cause value, and the session cause value is re-establishing the second session. The notification message is used to indicate that a cause of re-establishing the session by the AMF entity is replacing the UPF entity. In this case, before step S103, this embodiment of the present invention further includes:

S108. The AMF entity stores a mapping relationship between an identifier of the first session and the SMF entity based on a notification message.

The identifier of the first session is used to uniquely identify the first session. The identifier of the first session in this embodiment of the present invention may be set based on a requirement, and the mapping relationship between the identifier of the first session and the SMF entity may be stored in a storage device of the AMF entity in a form of a table.

Correspondingly, before step S104, this embodiment of the present invention may further include:

S109. The user equipment allocates an identifier same as the identifier of the first session to the second session, and adds the identifier of the second session to the second message as identifier information.

The identifier of the second session is used to uniquely identify the second session.

It may be understood that, after the user equipment performs S109, the user equipment determines the identifier of the second session as the identifier information and adds the identifier information to the second message, where the identifier of the second session is used to instruct the AMF entity to send the second message to the SMF entity, and the SMF entity is an SMF entity associated with a second identifier.

The user equipment may determine, based on first indication information carried in the first message, the identifier same as the identifier of the first session to the second session, or may determine by itself to allocate the identifier same as the identifier of the first session to the second session. Therefore, in one aspect, step S109 in this embodiment of the present invention may be implemented in the following manner:

S1091a. The UE allocates the identifier same as the identifier of the first session to the second session based on first indication information.

The first indication information is sent to the user equipment by using the first message, and the first indication information is used to instruct the UE to allocate the identifier same as the identifier of the first session to the second session.

In another aspect, step S109 in this embodiment of the present invention may be further implemented in the following manner:

S1091b. The user equipment obtains a session and service continuity mode of the first session.

It may be understood that, the user equipment may obtain the session and service continuity mode of the first session by interacting with another device.

The session and service continuity mode of the first session obtained by the UE may be specifically configured by the SMF entity when the UE establishes the first session, or may be updated by the SMF entity to the UE after the first session is established. A specific implementation includes:

An SSC mode selection policy may be configured for the UE, where the SSC mode selection policy is used to determine an association relationship between an application or a group of applications and the SSC mode. When an application requests to transmit data, the UE determines, based on the SSC mode selection policy, an SSC mode of a session to be established, and the UE adds a requested SSC mode to a session establishment request message; the SMF entity accepts the SSC mode requested by the UE, or modifies the requested SSC mode based on a subscription and a policy of an operator or the like; and finally, the SMF entity notifies, after determining the SSC mode of the session, the UE of the selected or accepted SSC mode.

Alternatively, the UE may not add an SSC mode to a session establishment request message, but the SMF directly determines the SSC mode of the session based on a UE subscription and a policy of an operator or the like, and finally, the SMF entity notifies the UE of the selected or accepted SSC mode.

S1092b. The user equipment determines that the session and service continuity mode of the first session is a first mode, and allocates the identifier same as the identifier of the first session to the second session.

Optionally, the second message in this embodiment of the present invention further carries the identifier information, and the identifier information is used to instruct the AMF entity to send the second message to the SMF entity associated with the identifier information.

Figure 5A:
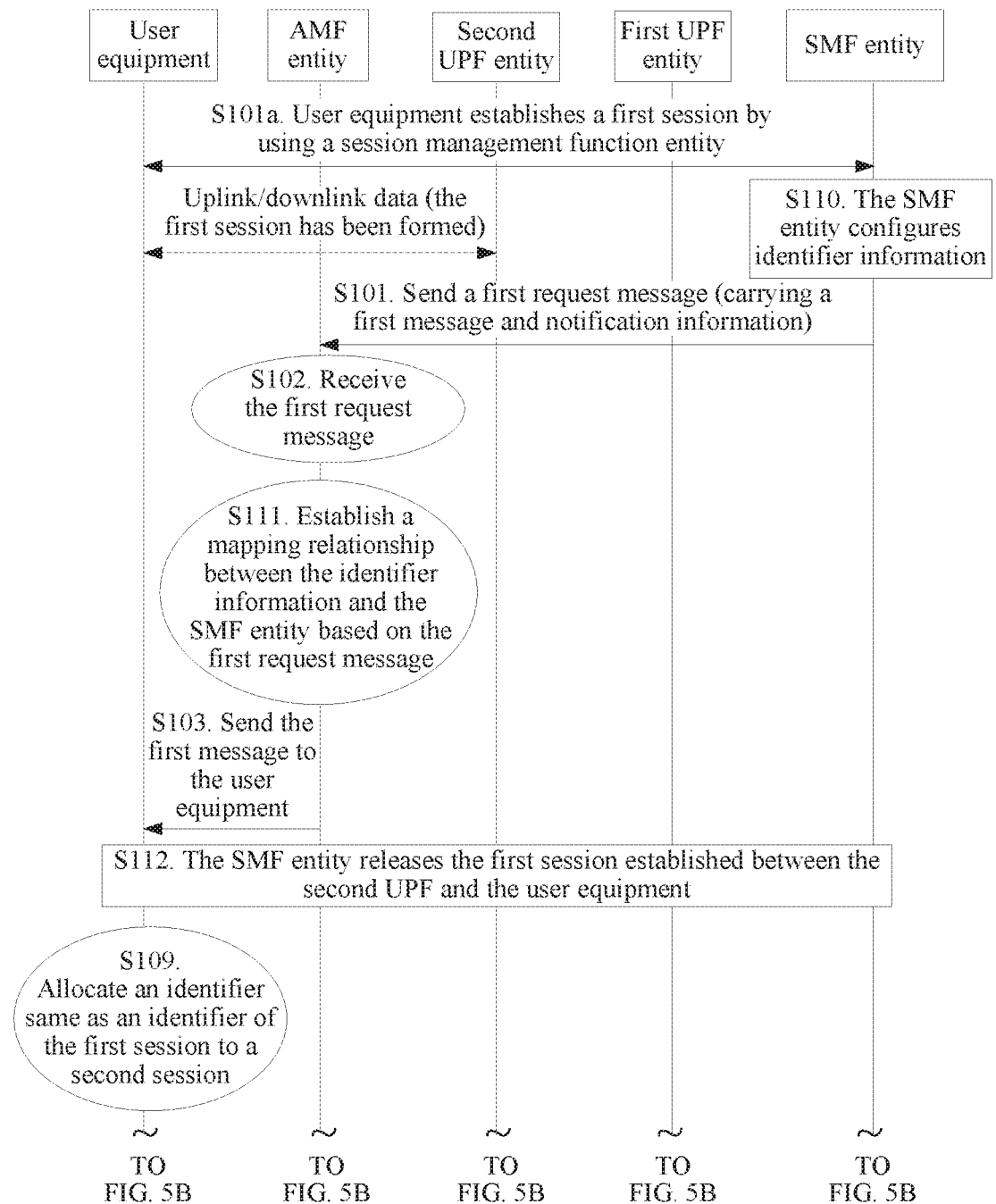
FIG. 5A and FIG. 5B are a third schematic flowchart of a method for establishing a session according to an embodiment of the present invention.
Figure 5B:
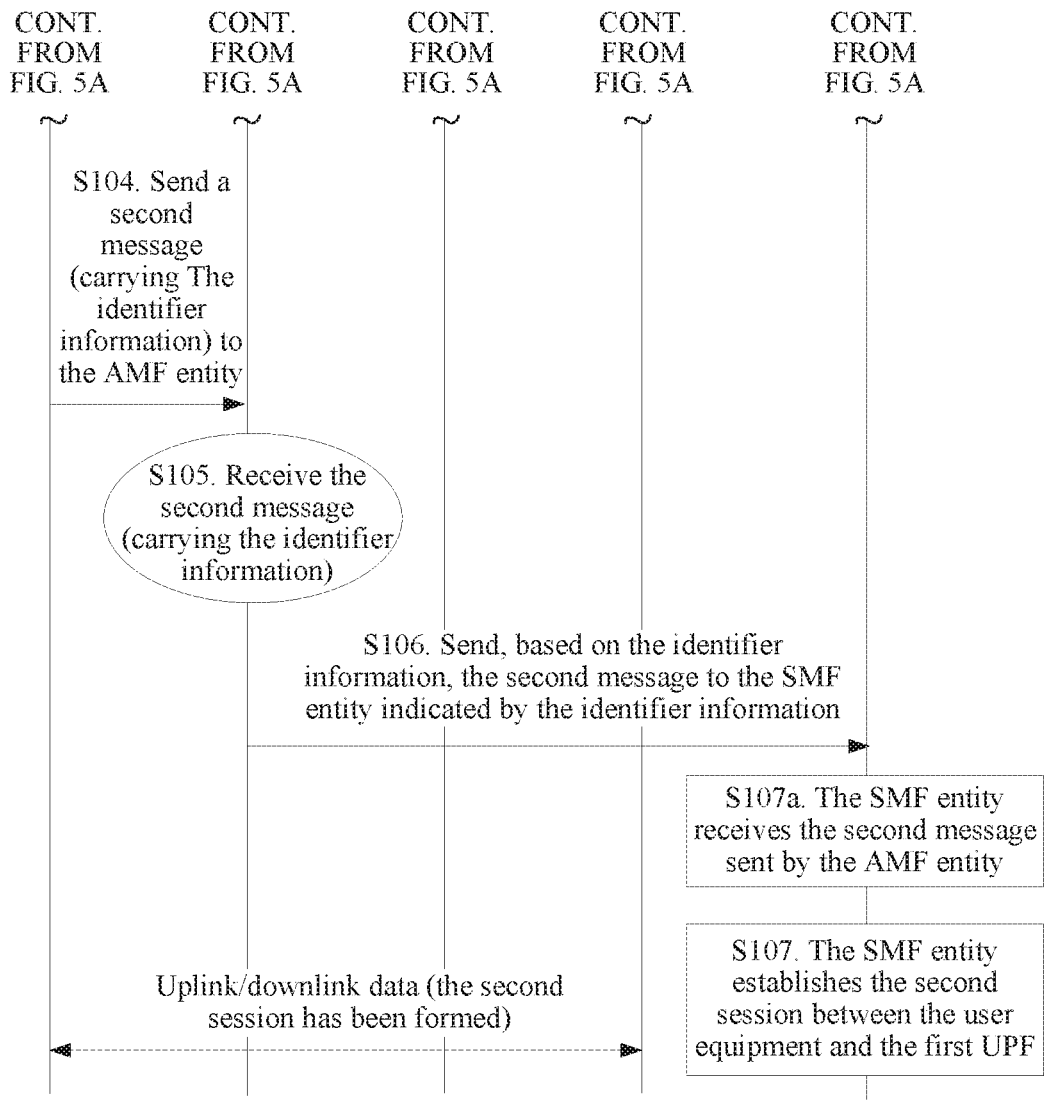

In this case, with reference to FIG. 3, as shown in FIG. 5A and FIG. 5B, before step S101, this embodiment of the present invention further includes:

S110. The SMF entity configures the identifier information.

The identifier information configured by the SMF entity is forwarded by the AMF entity to the user equipment in a form of the first message, the first message further carries the identifier information, and the first message is further used to instruct the user equipment to add the identifier information to the second message.

Optionally, the first request message further carries the identifier information, and the first request message is further used to instruct the AMF entity to establish a mapping relationship between the identifier information and the identifier of the SMF entity. Therefore, before step S106, the method provided by this embodiment of the present invention further includes:

Optionally, the identifier information is indication information used to uniquely identify the identifier of the SMF entity, and may be a number or may be other information. This is not limited in this embodiment of the present invention. The identifier of the SMF entity is used to uniquely identify the SMF entity, and may be a MAC address of the SMF entity, or may be a product number of the SMF entity. For example, the identifier information is 101, and the identifier of the SMF entity is a first identifier, and in this case, the AMF entity may establish the following mapping relationship in a storage apparatus of the AMF entity, as shown in Table 1

TABLE 1

Mapping relationship table

| Identifier information | Identifier of the SMF entity |
|---|---|
| 101 | First identifier |

S111. The AMF entity establishes a mapping relationship between the identifier information and the identifier of the SMF entity based on the first request message.

Because the second message may carry the identifier information, or may carry the identifier of the second session, an implementation of step S106 may vary, and is hereinafter described in detail with reference to content of the second message:

In one aspect, if the second message carries the identifier information, step S106 may be implemented in the following manner:

S1061a. The AMF entity determines, based on the identifier information, the SMF entity having a mapping relationship with the identifier information.

Optionally, the AMF entity may determine, based on the identifier information, in a pre-established mapping relationship between the identifier information and the SMF entity, the SMF entity having the mapping relationship with the identifier information.

S1062a. The AMF entity sends the second message to the SMF entity having the mapping relationship with the identifier information.

In another aspect, if the second message carries the identifier of the second session, step S106 may be implemented in the following manner:

S1061b. The AMF entity determines, based on the identifier of the second session, the SMF entity associated with the identifier of the second session.

Optionally, the AMF entity determines, based on the identifier of the second session, in the mapping relationship between the identifier of the first session and the SMF entity that is established in step S108, the SMF entity associated with the identifier of the second session. Because the identifier of the second session is the same as the identifier of the first session, the identifier of the second session may be used to determine the SMF entity associated with the identifier of the second session.

S1062b. The AMF entity sends the second message to the SMF entity associated with the identifier of the second session.

In conclusion, in the scenario of the session and service continuity mode 1, the second message may carry the identifier of the second session. In this case, the mapping relationship between the identifier of the first session and the identifier of the SMF entity needs to be established in the AMF entity. Alternatively, the second message may carry the identifier information. In this case, the mapping relationship between the identifier information and the SMF entity needs to be established in the AMF entity. Alternatively, the second message may carry both the identifier of the first session and the identifier information. In this case, the AMF entity needs to establish at least one of the mapping relationship between the identifier of the first session and the SMF entity and the mapping relationship between the identifier information and the SMF entity.

Optionally, the first message in this embodiment of the present invention further carries second indication information, and the second indication information is used to indicate that a data network DN of the second session is the same as a DN of the first session. After receiving the second message, the user equipment may determine, according to the second indication information, that the data network DN of the second session is the same as the DN of the first session.

Optionally, after step S103, the method provided by this embodiment of the present invention further includes:

S112. The SMF entity releases the first session established between the user equipment and a second UPF entity.

Next, an example in which a second scenario is the session and service continuity mode 2 is used for description.

In the second scenario, the SMF entity may configure the identifier information or may not configure the identifier information. Depending on whether the SMF entity configures the identifier information or not, content of the first request message may vary. Therefore, separate descriptions are provided hereinafter.

Figure 6A:
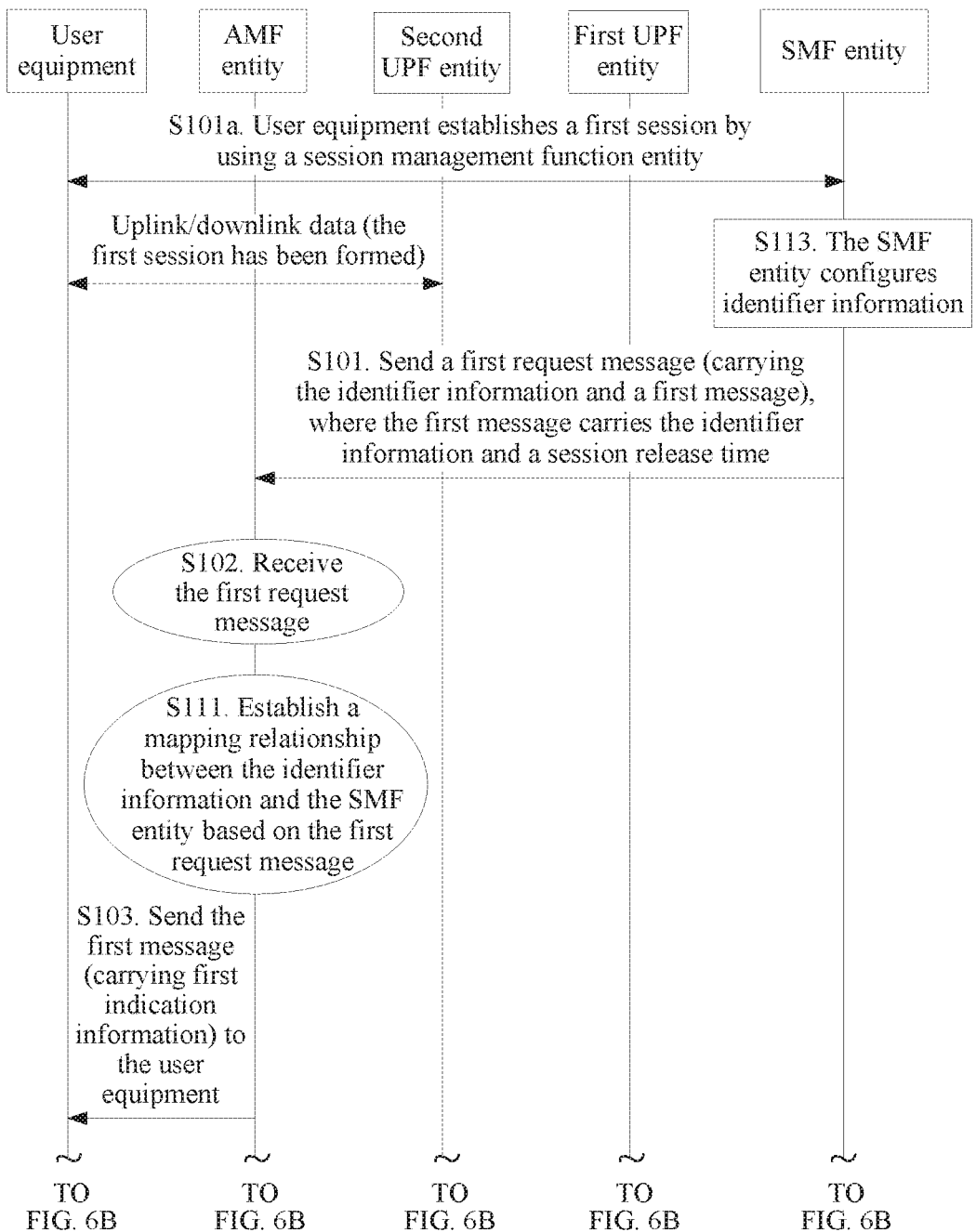
FIG. 6A and FIG. 6B are a fourth schematic flowchart of a method for establishing a session according to an embodiment of the present invention.
Figure 6B:
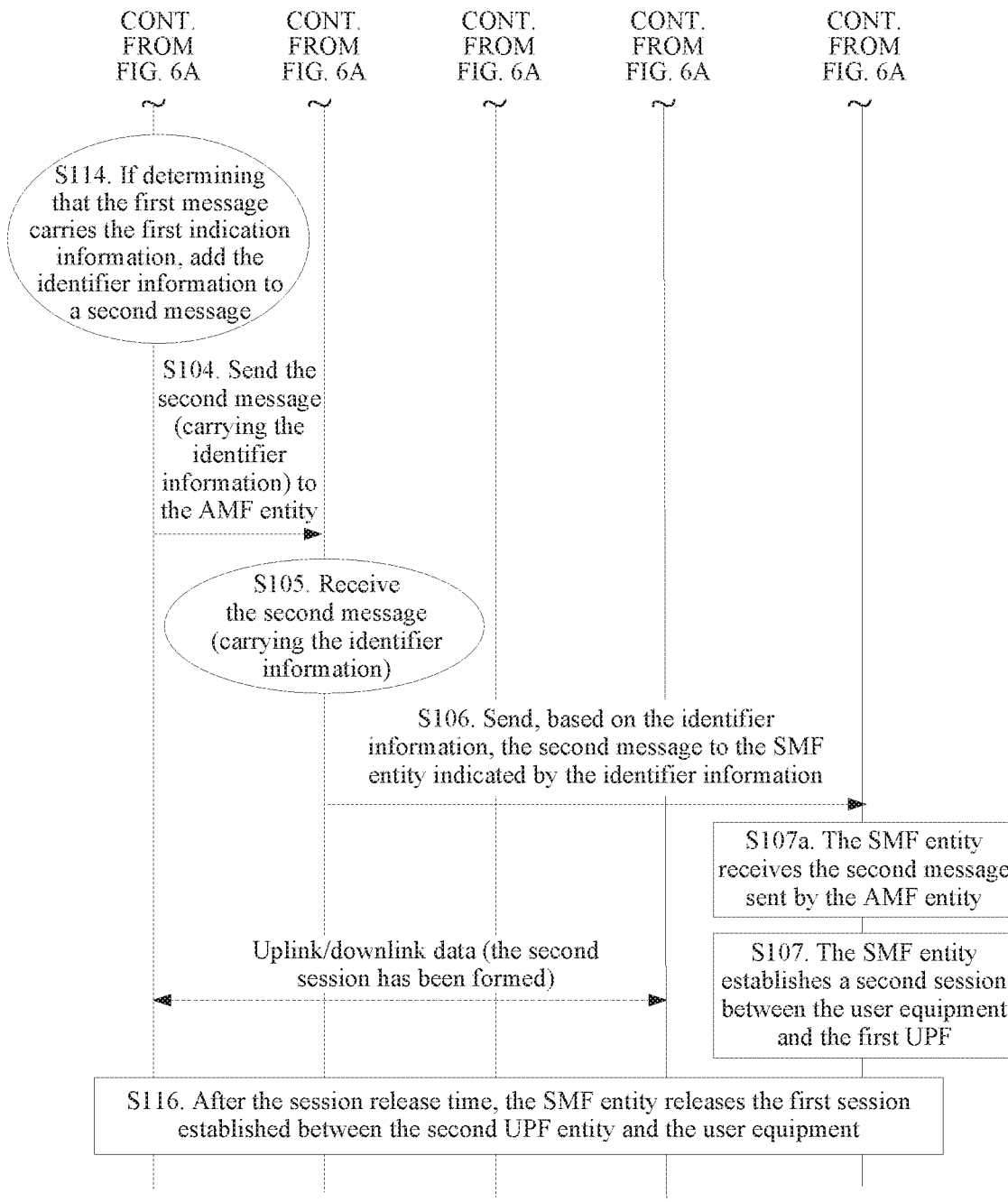

Assuming that the SMF entity configures the identifier information, with reference to FIG. 3, before step S101, the method provided by the embodiment of the present invention shown in FIG. 6A and FIG. 6B further includes:

S113. The SMF entity configures the identifier information, where the identifier information is used to instruct the AMF entity to send the second message to the SMF entity associated with the identifier information.

It may be understood that, in this case, the first request message sent by the SMF entity to the AMF entity carries the identifier information and the first message, where the first message carries the identifier information and the session release time, and the first message is used to instruct the UE to send, within the session release time, the request for establishing the second session.

Specifically, before step S103, the method provided by this embodiment of the present invention further includes step S111. Specifically, for an implementation of step S111, refer to descriptions of the foregoing embodiment. Details are not described again herein in this embodiment of the present invention.

Optionally, the first message further carries third indication information, and the third indication information is used to instruct the UE to add the identifier information to the second message. Therefore, before step S104, the method in this embodiment of the present invention may further include the following step:

S114. If the UE determines that the first message carries third indication information, where the third indication information is used to instruct the UE to add the identifier information to the second message, the UE adds the identifier information to the second message.

Optionally, after determining that the received first message carries the identifier information, the user equipment adds the identifier information to the second message.

Optionally, the identifier information is the identifier information configured by the SMF entity and received by the UE by using the AMF entity.

Specifically, the user equipment may actively add the identifier information to the second message, or may add the identifier information to the second message based on a trigger message (for example, the third indication information) carried in the first message.

Optionally, in one aspect, step S114 may be implemented in the following manner:

S1141a. If the first message carries the third indication information, where the third indication information is used to instruct the UE to add the identifier information to the second message, the UE adds the identifier information to the second message according to the third indication information.

In another aspect, step S114 may be implemented in the following manner:

S1141b. The UE obtains the session and service continuity mode of the first session.

S1142b. If the UE determines that the session and service continuity mode of the first session is the second mode, the UE determines the identifier of the first session as the identifier information and adds the identifier information to the second message.

In another aspect, step S114 may be implemented in the following manner:

S1141c. If the first message carries fourth indication information, and the fourth indication information is used to instruct the UE to use the identifier of the first session as the identifier information, the user equipment determines, according to the fourth indication information, the identifier of the first session as the identifier information and adds the identifier information to the second message.

The second mode is a session and service continuity mode SSC 2, the SSC 2 indicates that a network side allows the UE to first establish the second session before the first session is released, and the data network DN of the second session is the same as the DN of the first session. In SSC 2, the first session and the first session coexist for a period of time.

Optionally, in the second scenario, for an implementation of step S106, refer to implementations of steps S1061a and S1062a in the foregoing embodiment. Details are not described again herein in this embodiment of the present invention.

Figure 7A:
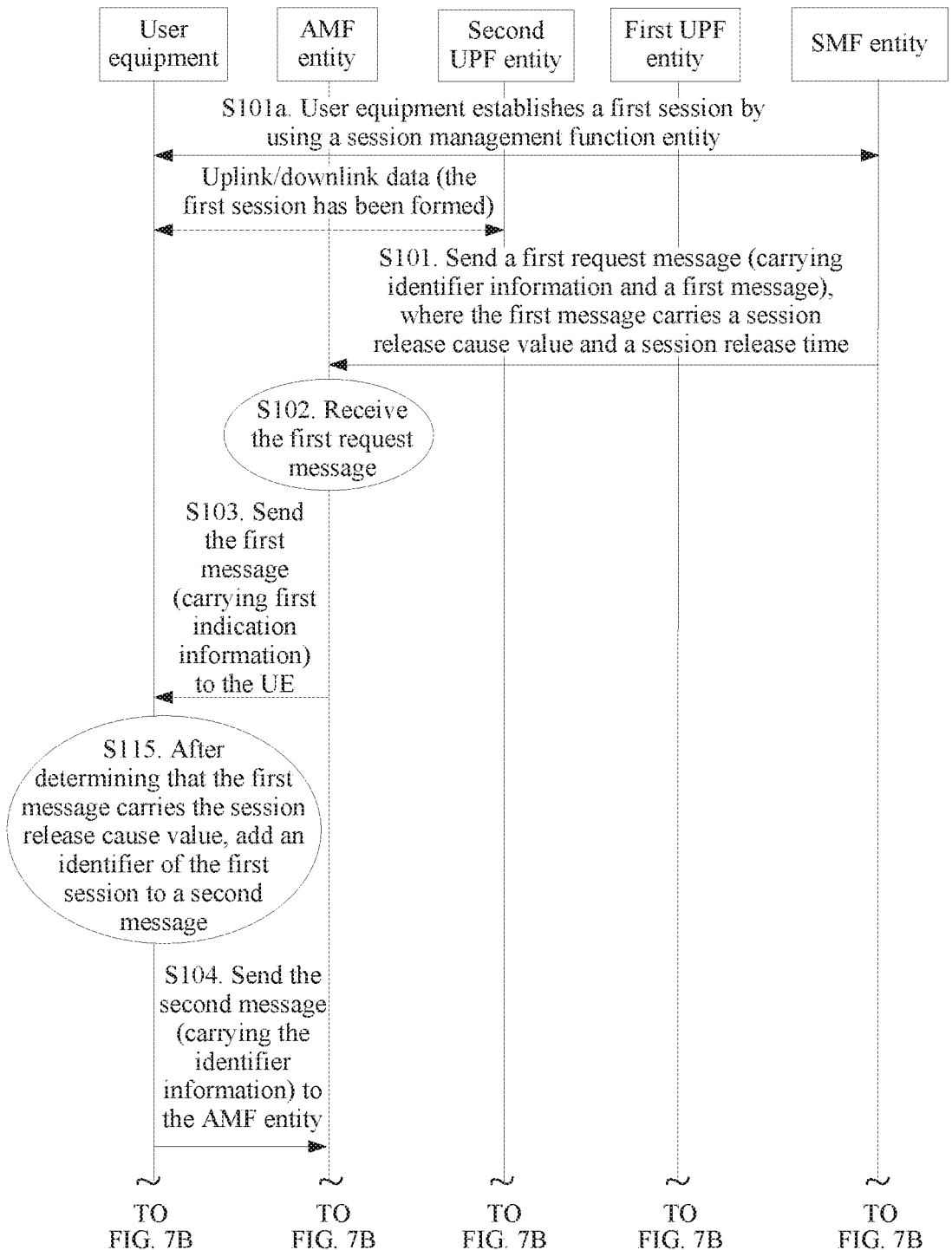
FIG. 7A and FIG. 7B are a fifth schematic flowchart of a method for establishing a session according to an embodiment of the present invention.
Figure 7B:
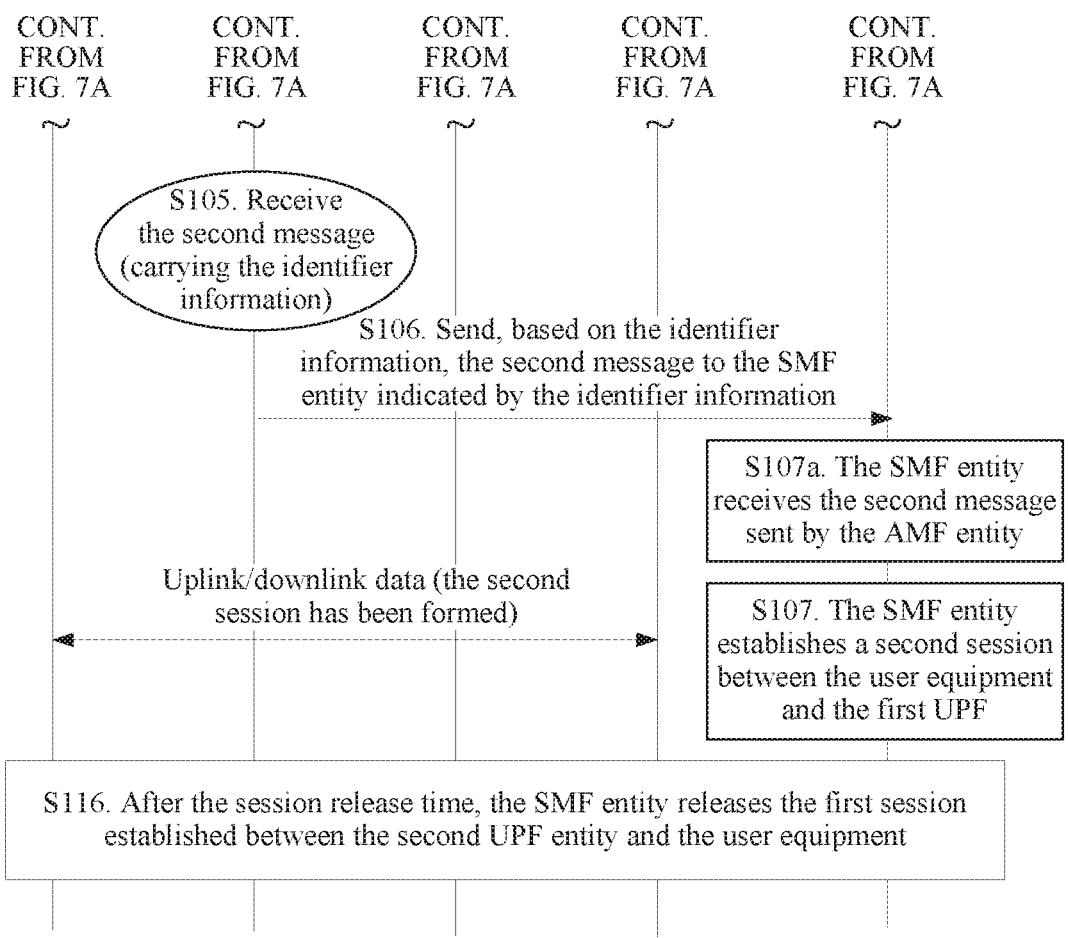

Assuming that the SMF entity does not configure the identifier information, with reference to FIG. 3, as shown in FIG. 7A and FIG. 7B, a difference between FIG. 7A and FIG. 6A lies in that the first request message in step S101 carries only the first message, where the first message carries the session release time and the session release cause value that is changing the UPF entity. The first message is used to instruct the user equipment to send the second message within the session release time, and step S111 is omitted in FIG. 7A. However, the first request message in FIG. 6A carries not only the first message but also the identifier information, the first request message is not only used to instruct the AMF entity to send the first message to the UE, but also used to instruct the AMF entity to establish the mapping relationship between the identifier information and the SMF entity, and the first message carries the identifier information and the session release time.

Optionally, before step S104, the method in this embodiment of the present invention may further include the following step:

S115. After receiving the session release cause value carried in the first message, the user equipment adds the identifier of the first session to the second message.

Optionally, the second message may further carry the identifier of the second session.

In other words, the identifier information carried in the second message after the UE performs S115 is the identifier of the first session.

In this case, step S106 may be implemented in the following manner:

S1061c. The AMF entity sends, based on the identifier of the first session, the second message to the SMF entity associated with the identifier of the first session.

It may be understood that, because the SMF entity does not release the first session established between the SMF entity and the user equipment, the AMF entity stores the mapping relationship between the identifier of the first session and the SMF entity. Therefore, the AMF entity may send, based on the identifier of the first session, the second message to the SMF entity associated with the identifier of the first session.

It may be understood that, a common point between the embodiments described in FIG. 6A, FIG. 6B, FIG. 7A, and FIG. 7B lies in that after step S107, the method further includes:

S116. After the session release time, the SMF entity releases the first session established between the second UPF entity and the user equipment.

Optionally, the first message in the embodiments described in FIG. 6A, FIG. 6B, FIG. 7A, and FIG. 7B further carries the second indication information, and the second indication information is used to indicate, to the UE, that the DN of the second session is the same as the DN of the first session.

It may be understood that, regardless of whether the SMF entity re-establishes the second session in session and service continuity mode 1 or session and service continuity mode 2, before the SMF entity triggers the user equipment to send the second message, the first session exists between the user equipment and the SMF entity. In other words, the first session is a session established between the SMF entity and the user equipment by the SMF entity by using the second UPF entity before the SMF entity triggers the user equipment to send the second message.

Optionally, the second message in this embodiment of the present invention may further carry the identifier information, the identifier of the first session, or the identifier of the second session that is the same as the identifier of the first session (in this case, the session is a session established between the SMF entity and the user equipment by the SMF entity in session and service continuity mode 2). Therefore, after receiving the identifier information, the SMF entity may directly determine to select the first UPF entity to establish the second session between the SMF entity and the user equipment.

It may be understood that, the first UPF entity in this embodiment of the present invention has been selected before the SMF entity triggers the UE to send the second message.

It may be understood that, in the foregoing embodiment of the present invention, the UE may determine, based on the indication information sent by the SMF entity and received by using the AMF entity, the identifier of the first session as the identifier information, and add the identifier information to the second message (this case is used in SS 1 mode), or add the identifier of the second session to the second message as the identifier information (this case is used in SS 2 mode), or may add the identifier information configured by the SMF entity to the second message as the identifier information (in this case, the first message should carry the identifier information configured by the SMF entity); in another aspect, the UE determines, based on the session and service continuity mode of the first session, the identifier of the first session as the identifier information and adds the identifier information to the second message (this case is used in SS 1 mode), or adds the identifier of the second session to the second message as the identifier information (this case is used in SS 2 mode).

Figure 8:
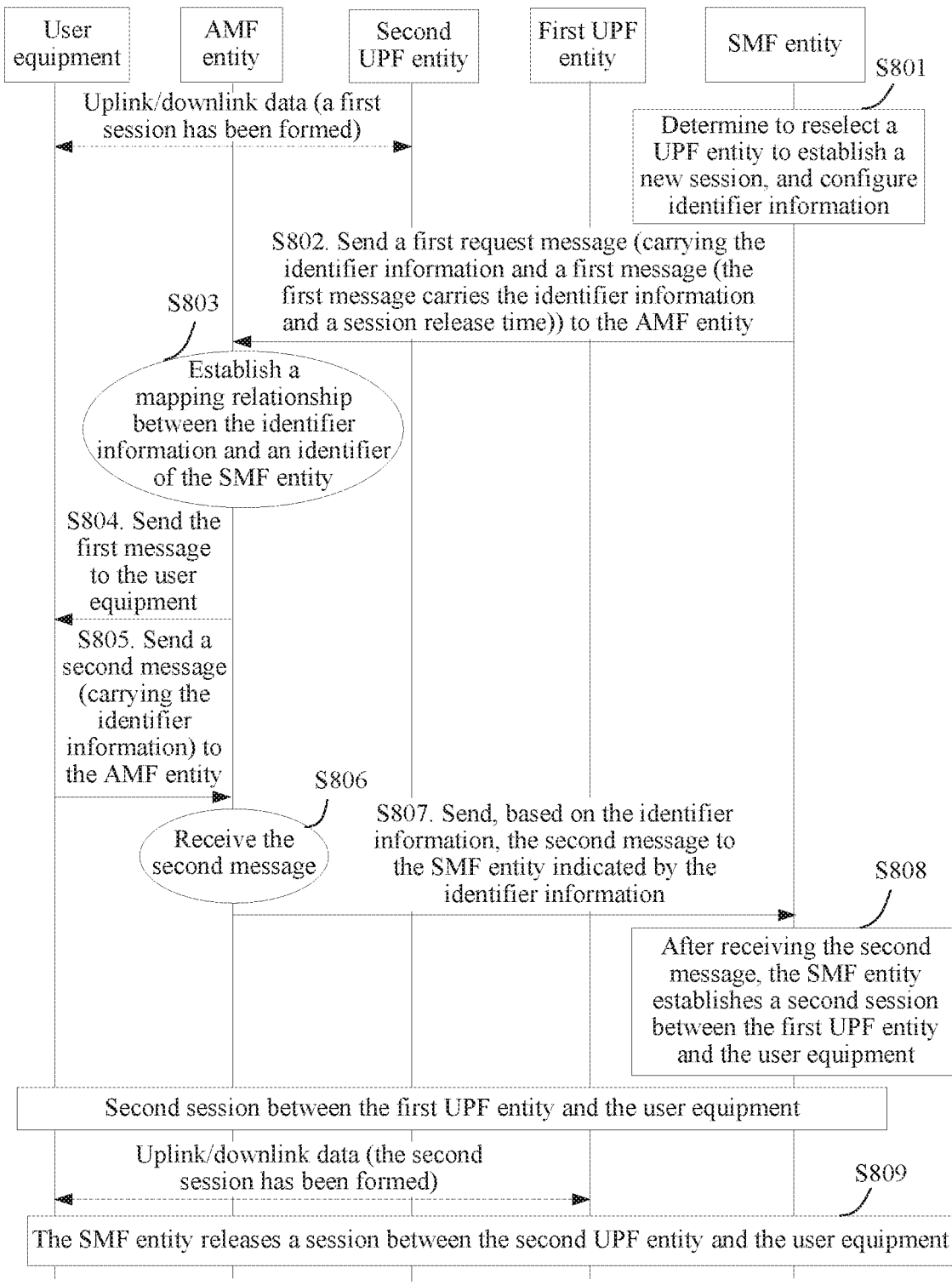
FIG. 8 is a schematic flowchart of specific use of a method for establishing a session according to an embodiment of the present invention.

FIG. 8 shows a specific implementation of a method for establishing a session according to an embodiment of the present invention. The manner shown in FIG. 8 is applicable to the session and service continuity mode 2 described in the foregoing embodiment. To be specific, an SMF entity first establishes a second session, and then the SMF entity releases a first session.

The SMF entity determines to reselect a UPF entity to establish a new session, and performs S801; Configure identifier information.

S802. The SMF entity sends a first request message to an AMF entity, where the first request message carries a first message and the identifier information, the first message carries a session release time and the identifier information, and the first message is used to instruct user equipment to send a message for requesting to establish a second session.

Specifically, the first request message is used to instruct the AMF entity to establish a mapping relationship between the identifier information and an identifier of the SMF entity and send the first message to the user equipment.

S803. The AMF entity establishes a mapping relationship between the identifier information and an identifier of the SMF entity based on the first request message.

S804. The AMF entity sends the first message to the user equipment.

It may be understood that, in an actual process, a sequence of steps S803 and S804 may be changed. To be specific, the AMF entity first performs S804 and then performs S803, or the AMF entity performs S803 and S804 simultaneously. The sequence of steps S803 and S804 does not affect the solution of this embodiment of the present invention.

S805. The user equipment sends a second message carrying the identifier information to the AMF entity, where the identifier information is used to instruct the AMF entity to send the second message to the SMF entity associated with the identifier information, and the second message is used to instruct the SMF entity to establish a session between a first UPF and the SMF entity.

It may be understood that:

S806. The AMF entity receives the second message, where the second message carries the identifier information.

S807. The AMF entity sends, based on the identifier information, the second message to the SMF entity associated with the identifier information.

S808. After receiving the second message, the SMF entity establishes the second session between the first UPF entity and the user equipment.

S809. After the session release time, the SMF entity releases a first session established between the user equipment and a second UPF entity.

Figure 9:
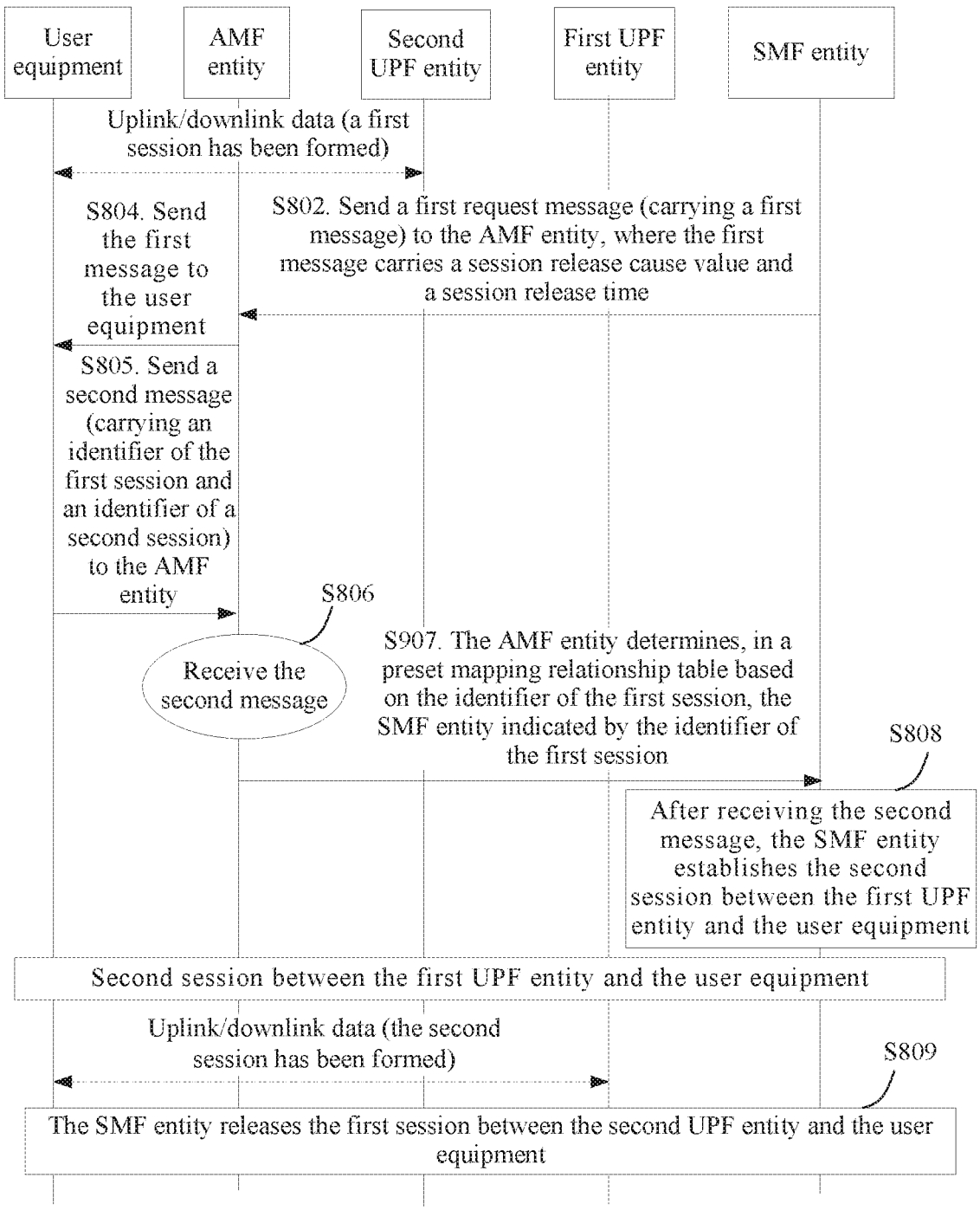
FIG. 9 is a schematic flowchart of specific use of another method for establishing a session according to an embodiment of the present invention.

FIG. 9 shows a specific implementation of another method for establishing a session according to an embodiment of the present invention. A common point between FIG. 9 and FIG. 8 lies in that both are applicable to the session and service continuity mode 2 described in the foregoing embodiment. To be specific, an SMF entity first establishes a second session, and then the SMF entity releases a first session.

A difference between FIG. 9 and FIG. 8 is as follows: In FIG. 9, step S801 is omitted before S802, the first request message in step S802 carries only the second message, but content carried in a second message in FIG. 9 is a session release time and a session release cause value, where the session release cause value is used to instruct user equipment to allocate an identifier different from an identifier of a second session to a first session, and a first message in S805 in FIG. 9 carries at least the identifier of the first session (may further carry both the identifier of the second session and the identifier of the first session), where the identifier of the first session is used to instruct an AMF entity to send the second message to an SMF entity associated with the identifier of the first session (it may be understood that, in session and service continuity mode 2, the AMF entity prestores a mapping relationship between each session established by the SMF entity and the SMF entity establishing the session, that is, the AMF entity prestores a preset mapping relationship table, where the table stores at least the identifier of the first session and the SMF entity associated with the identifier of the first session, and the SMF entity associated with the identifier of the first session is an SMF entity establishing the first session). In this case, the identifier of the second session is identifier information.

Specifically, S807 in FIG. 8 may be replaced with step S907 in FIG. 9.

S907. The AMF entity determines, in the preset mapping relationship table based on the identifier of the first session, the SMF entity associated with the identifier of the second session.

Figure 10A:
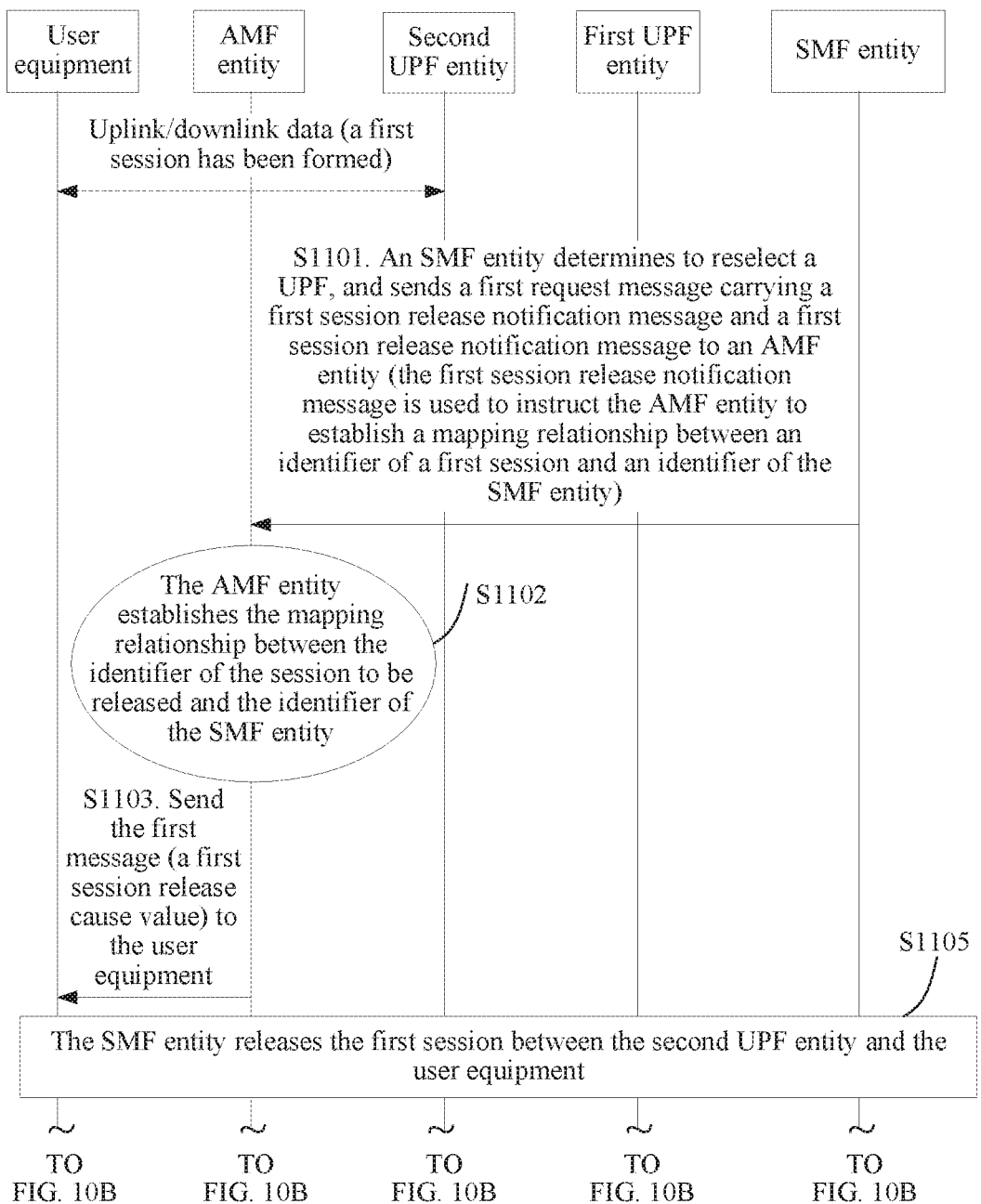
FIG. 10A and FIG. 10B are a schematic flowchart of specific use of another method for establishing a session according to an embodiment of the present invention.
Figure 10B:
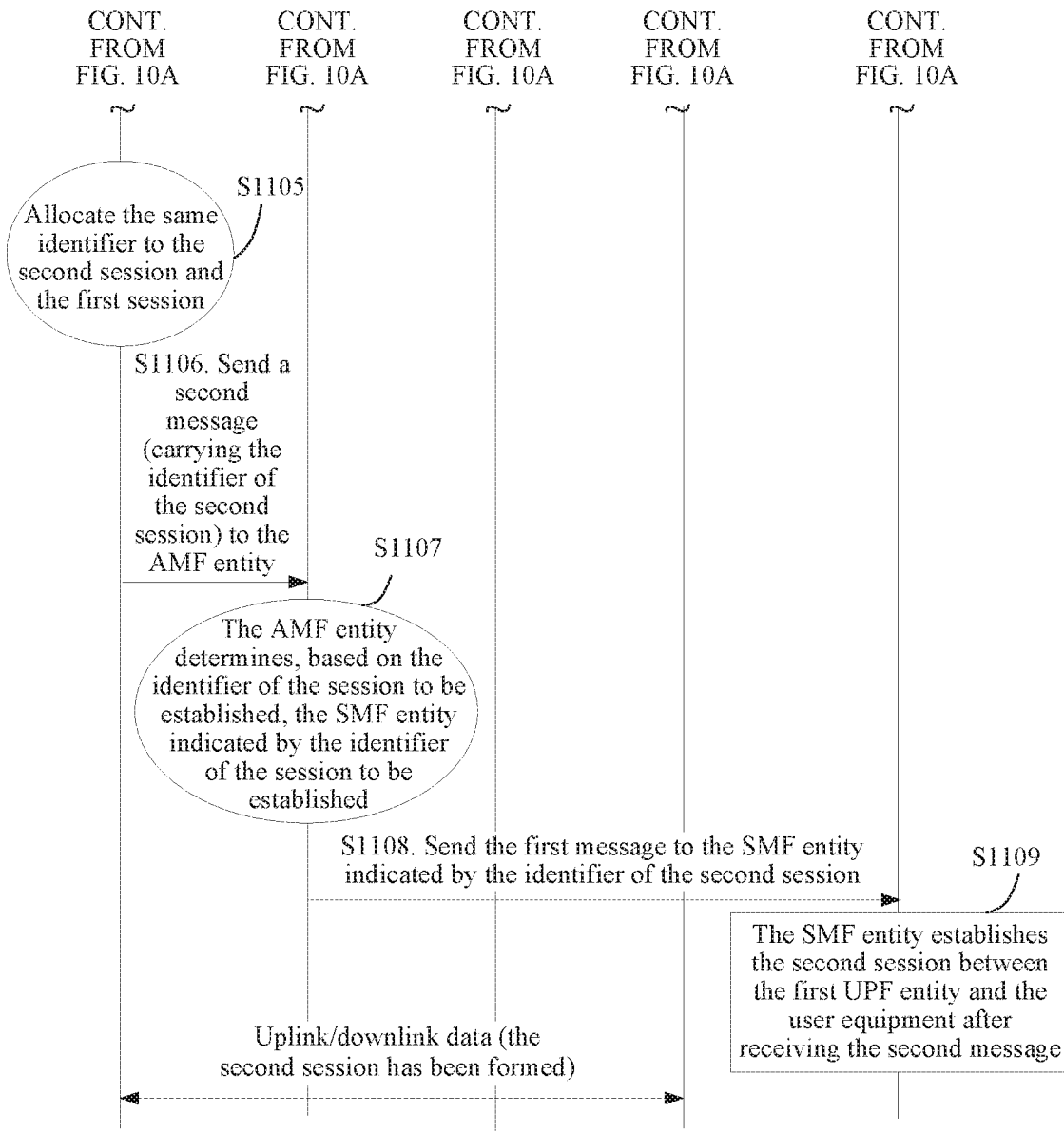

FIG. 10A and FIG. 10B show a specific implementation of another method for establishing a session according to an embodiment of the present invention. FIG. 10A and FIG. 10B differ from FIG. 9 and FIG. 8 in that the method provided in FIG. 10A and FIG. 10B is applicable to the session and service continuity mode 1 in the foregoing embodiment. To be specific, a first session is released first, and then a second session is established.

S1101. An SMF entity determines to reselect a UPF entity, and sends a first request message to an AMF entity, where the first request message carries a first message and a first session release notification message, the first message carries a first session release cause value that is re-establishing a session, the first message is used to instruct UE to allocate a same identifier to a second session and a first session, and the first session release notification message is used to instruct the AMF entity to establish a mapping relationship between the identifier of the first session and an identifier of the SMF entity.

It may be understood that, the first request message is used to instruct the AMF entity to send the first session release notification message (that is, the first message) to the UE.

S1102. The AMF entity stores the mapping relationship between the identifier of the first session and the identifier of the SMF entity.

S1103. The AMF entity sends the first message to the user equipment.

S1104. The SMF entity releases the first session established between the user equipment and a second UPF entity.

S1105. The user equipment allocates the same identifier to the first session and the second session.

S1106. The user equipment sends a second message to the AMF entity, where the second message carries the identifier of the first session. The identifier of the first session is used to instruct the AMF entity to send the second message to the SMF entity associated with the identifier of the first session, and the second message is used to instruct the SMF entity to establish the second session between the SMF entity and the user equipment.

In other words, identifier information is the identifier of the first session.

S1107. The AMF entity determines, based on the identifier of the first session, the SMF entity associated with the identifier of the first session.

S1108. The AMF entity sends the second message to the SMF entity indicated by the identifier of the first session.

S1109. The SMF entity establishes the second session between the user equipment and a first UPF entity based on the second message.

In the method for establishing a session according to this embodiment of the present invention, the identifier information is carried in the second message, and then the AMF entity sends, based on the identifier information, the second message to the SMF entity specified by the identifier information. This is because a purpose of triggering, by the SMF entity, the user equipment to send the second message is to re-establish a session. However, in a system for establishing a session, the second message sent by the user equipment can be forwarded to the SMF entity only by the AMF entity, and when forwarding the second message, the AMF entity needs to perform a process of selecting an SMF entity. Therefore, in this embodiment of the present invention, the identifier information may be used to avoid a problem that processing efficiency is low because the AMF entity needs to perform the process of selecting an SMF entity again when receiving the second message, and avoid a problem that the SMF entity selected by the AMF entity is inconsistent with the SMF entity that triggers the user equipment to send the second message. Further, in this embodiment of the present invention, the identifier information may be used to enable the SMF entity not to perform a process of reselecting a UPF entity again after the SMF entity receives the identifier information. The reason is that the SMF entity triggers the UE to send the second message usually because the SMF entity has determined, before triggering the UE to send the second message, that a UPF entity (for example, the first UPF entity) establishing a session with the UE at this time already cannot satisfy a user requirement, and has selected an appropriate UPF entity (for example, the first UPF entity) to re-establish the second session with the UE. This can further optimize a user plane finally after the second session is established.

The solution provided by this application is described above mainly from a perspective of interaction between the user equipment, the AMF entity, and the SMF entity. It may be understood that, to implement the foregoing functions, the user equipment, the AMF entity, the SMF entity, and the like include corresponding hardware structures and/or software modules for performing the functions. A person skilled in the art should be easily aware that, with reference to the examples described in the embodiments disclosed in this specification, the user equipment, the AMF entity, the SMF entity, and the method steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of the present invention, functional modules may be defined for the user equipment, the AMF entity, and the SMF entity based on the foregoing methods. For example, each functional module may be defined in a correspondence to each function, or two or more functions may be integrated into one processing module. The integrated module may be implemented in a form of hardware, or may be implemented in a form of a software functional module. It should be noted that, division of modules in the embodiments of the present invention is merely an example, and is only division of logical functions. Other division manners may be available in actual implementations.

Figure 11A:
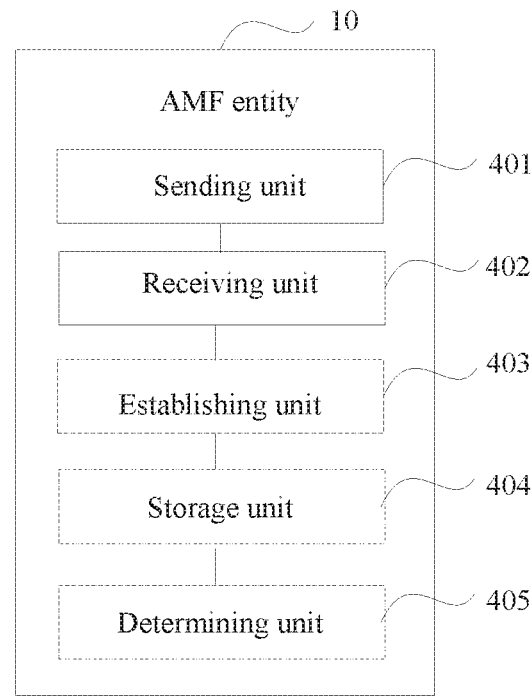
FIG. 11a is a first schematic structural diagram of an AMF entity according to an embodiment of the present invention.

When each functional module is defined in a correspondence to each function, FIG. 11a is a possible schematic structural diagram of the AMF entity in the foregoing embodiment. The AMF entity 10 includes a sending unit 401 and a receiving unit 402. The receiving unit 402 is configured to support the AMF entity 10 in performing steps S102 and S806 in the foregoing embodiment. The sending unit 401 is configured to support the AMF entity 10 in performing steps S103, S804, S807, S1104, and S1108 in the foregoing embodiment. It may be understood that, the AMF entity 10 provided by this embodiment of the present invention may further include an establishing unit 403, a storage unit 404, and a determining unit 405. The establishing unit 403 is configured to support the AMF entity 10 in performing step S111 in the foregoing embodiment. The storage unit 404 is configured to support the AMF entity 10 in performing steps S108 and S1102 in the foregoing embodiment. The establishing unit 403 is configured to support the AMF entity 10 in performing steps S111 and S1102 in the foregoing embodiment. Optionally, the AMF entity further includes a determining unit 405, configured to support the UE in performing steps S1061a, S1061b, S1107, and S907 in the foregoing embodiment. All related content of steps in the foregoing method embodiment may be cited in function descriptions of corresponding functional modules. Details are not described again herein.

Specifically, in a hardware implementation, the receiving unit 402 may be a receiver of the AMF entity 10, and the sending unit 401 may be a transmitter of the AMF entity 10, where the transmitter and the receiver may be integrated to form a transceiver, as shown in FIG. 2b. The establishing unit 403, the storage unit 404, and the determining unit 405 may be integrated in a processor of the AMF entity 10.

Figure 11B:
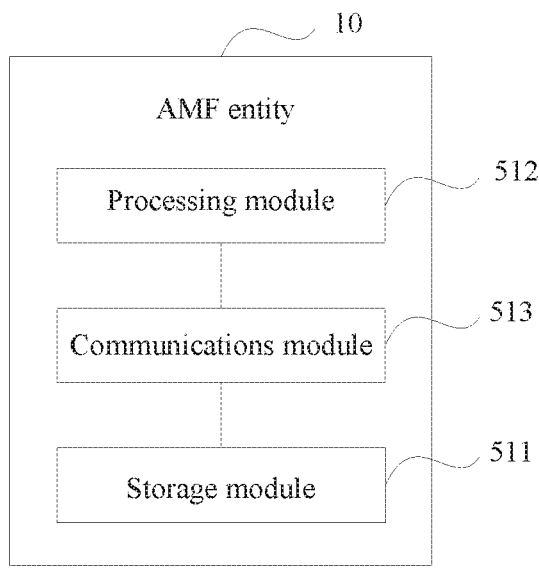
FIG. 11b is a second schematic structural diagram of an AMF entity according to an embodiment of the present invention.

When an integrated unit is used, FIG. 11b is a possible schematic diagram of a logical structure of the AMF entity 10 in the foregoing embodiment. The AMF entity 10 includes a processing module 512 and a communications module 513. The processing module 512 is configured to control and manage actions of the AMF entity 10. For example, the processing module 512 is configured to perform steps S102, S806, S103, S106 (S1062a, S1062b, and S1062c), S804, S807, S1104, S1108, S1061a, S1061b, S1061c, S804, S807, S1104, S1108, S108, S111, S803, S1102, S1061a, S1061b, S907, and S1107, and/or is used in other processes of the technology described in the specification. The communications module 513 is configured to support the AMF entity 10 in communicating with user equipment and an SMF entity. The AMF entity 10 may further include a storage module 511, configured to store program code and data of the AMF entity 10.

The processing module 512 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the digital signal processor and a microprocessor. The communications module 513 may be a transceiver, a transceiver circuit, a transceiver, or the like. The storage module 511 may be a memory.

When the processing module 512 is a processor, the communications module 513 is a transceiver, and the storage module 511 is a memory, the AMF entity in this embodiment of the present invention may be the device shown in FIG. 2b.

Figure 12A:
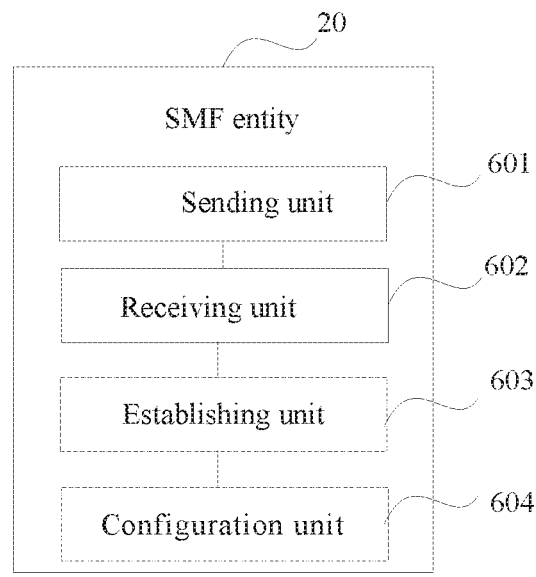
FIG. 12a is a first schematic structural diagram of an SMF entity according to an embodiment of the present invention.

When each functional module is defined in a correspondence to each function, FIG. 12a is a possible schematic structural diagram of the SMF entity in the foregoing embodiment. The SMF entity 20 includes a sending unit 601, a receiving unit 602, and an establishing unit 603. The receiving unit 602 is configured to support the SMF entity 20 in performing steps S107a and S808 in the foregoing embodiment. The establishing unit 603 is configured to support the SMF entity 20 in performing steps S107, S112, S116, S809, S1102, and S1109 in the foregoing embodiment. It may be understood that, the SMF entity in this embodiment of the present invention further includes a sending unit 601 and a configuration unit 604. The sending unit 601 is configured to support the SMF entity 20 in performing steps S101, S802, and S1101 in the foregoing embodiment. The configuration unit 604 is configured to support the SMF entity 20 in performing steps S110, S113, and S801 in the foregoing embodiment. All related content of steps in the foregoing method embodiment may be cited in function descriptions of corresponding functional modules. Details are not described again herein.

Specifically, in a hardware implementation, the sending unit 601 may be a transmitter of the SMF entity, and the receiving unit 602 may be a receiver of the SMF entity, where the receiver and the transmitter may be integrated to form a transceiver of the SMF entity 20, as shown in FIG. 2c. The establishing unit 603 and the configuration unit 604 may be integrated in a processor of the SMF entity 20.

Figure 12B:
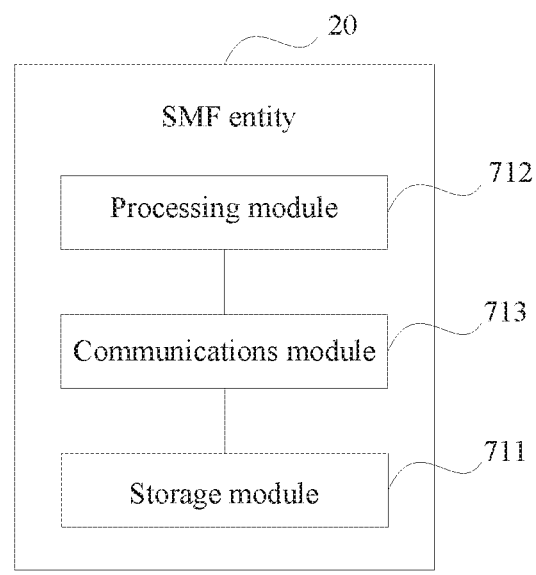
FIG. 12b is a second schematic structural diagram of an SMF entity according to an embodiment of the present invention.

When an integrated unit is used, FIG. 12b is a possible schematic diagram of a logical structure of the SMF entity 20 in the foregoing embodiment. The SMF entity 20 includes a processing module 712 and a communications module 713. The processing module 712 is configured to control and manage actions of the SMF entity 20. For example, the processing module 712 is configured to support the SMF entity 20 in performing steps S107a, S808, S107, S112, S116, S809, S1102, S1109, S101, S802, S1101, S110, S113, and S801 in the foregoing embodiment, and/or is used in another process of the technology described in the specification. The communications module 713 is configured to support the SMF entity 20 in communicating with an AMF entity. The SMF entity 20 may further include a storage module 711, configured to store program code and data of the SMF entity 20.

The processing module 712 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the digital signal processor and a microprocessor. The communications module 713 may be a transceiver, a transceiver circuit, a transceiver, or the like. The storage module 711 may be a memory.

When the processing module 712 is a processor, the communications module 713 is a transceiver, and the storage module 711 is a memory, the SMF entity in this embodiment of the present invention may be the device shown in FIG. 2c.

Figure 13A:
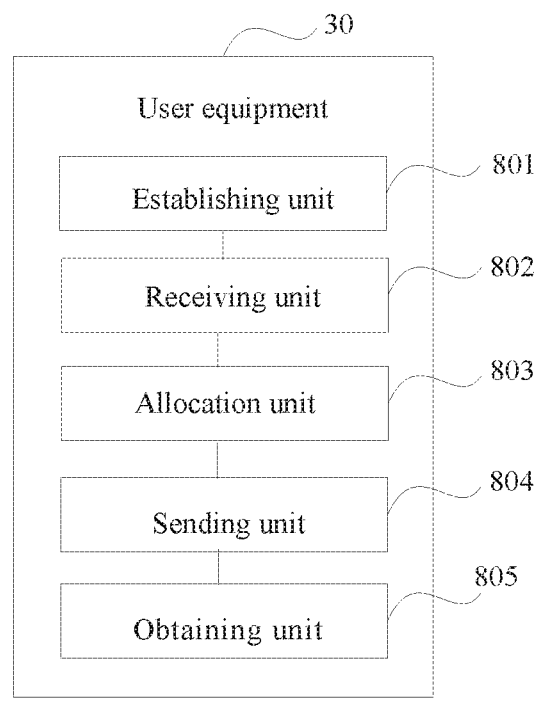
FIG. 13a is a first schematic structural diagram of user equipment according to an embodiment of the present invention.

When each functional module is defined in a correspondence to each function, FIG. 13a is a possible schematic structural diagram of the user equipment in the foregoing embodiment. The user equipment 30 includes an establishing unit 801, a receiving 802, an allocation unit 803, and a sending unit 804. The establishing unit 801 is configured to instruct the UE to perform S101a in the foregoing embodiment. The receiving unit 802 is configured to support the user equipment 30 in performing steps S104, S1102, and S1105 in the foregoing embodiment. The allocation unit 803 is configured to support the user equipment 30 in performing steps S109 (S1091a and S1092b) and S1105 in the foregoing embodiment. The sending unit 804 is configured to support the user equipment 30 in performing steps S104 and S1106 in the foregoing embodiment. It may be understood that, the user equipment 30 further includes an obtaining unit 805, configured to instruct the UE to perform S1091b. All related content of steps in the foregoing method embodiment may be cited in function descriptions of corresponding functional modules. Details are not described again herein.

Figure 13B:
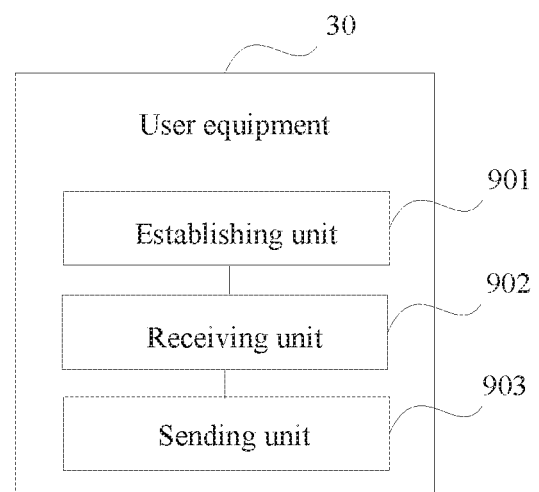
FIG. 13b is a second schematic structural diagram of user equipment according to an embodiment of the present invention.

When each functional module is defined in a correspondence to each function, FIG. 13b is a possible schematic structural diagram of the user equipment in the foregoing embodiment. The user equipment 30 includes an establishing unit 901, a receiving unit 902, and a sending unit 903. The establishing unit 901 is configured to support the UE in performing step S1101a in the foregoing embodiment. The receiving unit 902 is configured to support the user equipment 30 in performing step S104 in the foregoing embodiment. The sending unit 903 is configured to support the user equipment 30 in performing step S104 and step S805 in the foregoing embodiment. The user equipment further includes a determining unit and an obtaining unit. The determining unit is configured to support the user equipment in performing S114 (S141a, S1141b, and S1142b), and S115. The obtaining unit is configured to instruct the user equipment to perform S1141b. All related content of steps in the foregoing method embodiment may be cited in function descriptions of corresponding functional modules. Details are not described again herein.

Specifically, in a hardware implementation, the sending unit 903 and the sending unit 804 may be a transmitter of the user equipment 30, and the receiving unit 902 and the allocation unit 803 may be a receiver of the user equipment 30, where the receiver and the transmitter may be integrated to form a transceiver of the user equipment 30, as shown in FIG. 2d. The allocation unit 803, the establishing unit 901, the determining unit, and the allocation unit 802 may be integrated in a processor of the user equipment 30.

Figure 13C:
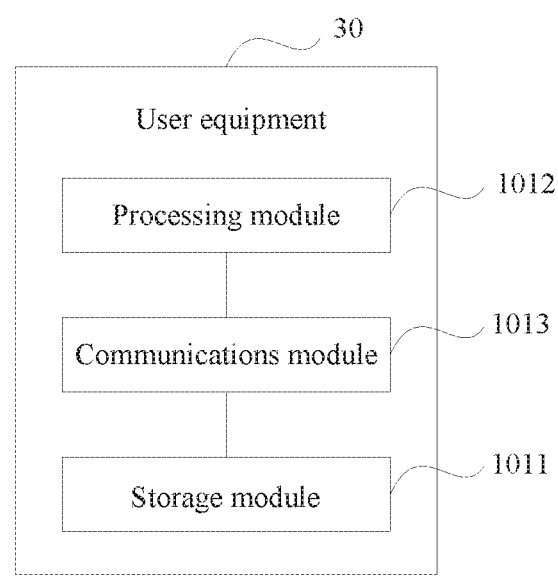
FIG. 13c is a third schematic structural diagram of user equipment according to an embodiment of the present invention.

When an integrated unit is used, FIG. 13c is a possible schematic diagram of a logical structure of the user equipment 30 in the foregoing embodiment. The user equipment 30 includes a processing module 1012 and a communications module 1013. The processing module 1012 is configured to control and manage actions of the user equipment 30. For example, the processing module 1012 is configured to support the user equipment 30 in performing steps S101a, S104. S1102, S1105, S109 (S1091a and S1092b) S1105, S104, S1106, and S1091b or Sll01a, S104, S104, S805, S114 (S1141a, S1141b, and S1142b), and S115, and/or is used in another process in the technology described in the specification. The communications module 1013 is configured to support the user equipment 30 in communicating with an AMF entity. The user equipment 30 may further include a storage module 1011, configured to store program code and data of the user equipment 30.

The processing module 1012 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the digital signal processor and a microprocessor. The communications module 1013 may be a transceiver, a transceiver circuit, a transceiver, or the like. The storage module 1011 may be a memory.

When the processing module 1012 is a processor, the communications module 1013 is a transceiver, and the storage module 1011 is a memory, the SMF entity in this embodiment of the present invention may be the device shown in FIG. 2d.

In one aspect, an embodiment of the present invention provides a computer-readable storage medium, where the computer-readable storage medium stores an instruction, and when the computer-readable storage medium runs on an SMF entity, the SMF entity is enabled to perform steps S107a, S808. S107, S112, S116, S809, S1102, S1109, S101, S802, S1101. S110, S113, and S801 in the foregoing embodiment.

In another aspect, an embodiment of the present invention provides a computer-readable storage medium, where the computer-readable storage medium stores an instruction, and when the computer-readable storage medium runs on an AMF entity, the AMF entity is enabled to perform steps S102, S806, S103. S106, (S1062a, S1062b and S1062c), S804, S807, S1104, S1108, S1061a. S1061b, S1061c, S804, S807, S1104, S1108, S108, S111, S803, S1103, S1061a, S1061b, S907, and S1107 in the foregoing embodiment.

In another aspect, an embodiment of the present invention provides a computer-readable storage medium, where the computer-readable storage medium stores an instruction, and when the computer-readable storage medium runs on user equipment, the user equipment is enabled to perform steps S101a, S104, S1102, S1105, S109 (S1091a and S1092b), S1105, S104, S1106, S1091b or S101a, S104, S104, S805, S114 (S1141a, S1141b, and S1142b), and S115 in the foregoing embodiment.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedures or functions according to the embodiments of the present invention are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line DSL) or wireless (for example, infrared, radio, and microwave, or the like) manner. The computer-readable storage medium may be any usable medium accessible by a computer, or a data storage device integrating one or more usable media, such as a server or a data center. The usable medium may be a magnetic medium (for example, a floppy disk, a hard disk, or a magnetic tape), an optical medium (for example, a DVD), a semiconductor medium (for example, a solid state disk (Solid State Disk (SSD)), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or a part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A system, comprising:
a session management function (SMF) entity configured to:
establish a first Protocol Data Unit (PDU) session, wherein the first PDU session is served by a second user plane function (UPF) entity;
determine that the second UPF entity needs to be changed; and
send a first request message indicating a PDU session re-establishment; and
an access and mobility management function (AMF) entity configured to:
receive the first request message from the SMF entity;
send a first message to a terminal in response to the first request message, wherein the first message comprises PDU session release time information associated with the first PDU session;
receive a second message comprising a PDU session establishment request and a first PDU session identifier (ID) from the terminal after the terminal determines that a session and service continuity (SSC) mode for the first PDU session is a mode comprising releasing the first PDU session after establishing a new PDU session, wherein the first PDU session ID is associated with the first PDU session; and
send the second message to the SMF entity based on an association between the first PDU session ID and an SMF ID associated with the SMF entity stored in the AMF entity, and
wherein the SMF entity is further configured to:
establish the new PDU session, wherein the new PDU session is served by a first UPF; and
release the first PDU session according to the PDU session release time information.

2. The system of claim 1, wherein the first message comprises a cause value indicating the PDU session re-establishment.

3. The system of claim 1, wherein the first message comprises the first PDU session ID associated with the first PDU session.

4. The system of claim 1, wherein the second message further comprises a second PDU session ID associated with the new PDU session.

5. The system of claim 1, wherein the SMF ID comprises a number that is stored in a relational database.

6. An apparatus, comprising:
at least one processor; and
a memory coupled to the at least one processor and configured to store programming instructions that, when executed by the at least one processor, cause the apparatus to:
establish a first Protocol Data Unit (PDU) session by communicating with a session management function (SMF) entity;
receive a first message indicating a PDU session re-establishment from an access and mobility management function (AMF) entity, wherein the first message comprises a first PDU session identifier (ID) associated with the first PDU session;
determine that a session and service continuity (SSC) mode for the first PDU session is a mode comprising releasing the first PDU session after establishing a new PDU session;
transmit, in response to the determination, a second message comprising a PDU session establishment request and the first PDU session ID, wherein the first PDU session ID indicates that the AMF entity selects the SMF entity for establishing the new PDU session; and
establish the new PDU session by communicating with the SMF entity.

7. The apparatus of claim 6, wherein the first message comprises PDU session release time information.

8. The apparatus of claim 6, wherein the second message comprises a second PDU session ID associated with the new PDU session.

9. The apparatus of claim 6, wherein the first message comprises a cause value indicating the PDU session re-establishment.

10. The apparatus of claim 6, wherein the first PDU session is served by a second user plane function (UPF), and wherein the new PDU session is served by a first UPF.

11. The apparatus of claim 6, wherein the AMF entity stores an association between the first PDU session ID and an SMF ID associated with the SMF entity.

12. The apparatus of claim 6, wherein the memory is further configured to store programming instructions that, when executed by the at least one processor, cause the apparatus to release the first PDU session.

13. The apparatus of claim 6, wherein the SMF ID comprises a number that is stored in a relational database.

14. A network apparatus, comprising:
at least one processor; and
a memory coupled to the at least one processor and configured to store programming instructions that, when executed by the at least one processor, cause the network apparatus to:
send a first message indicating a Packet Data Unit (PDU) session re-establishment to a terminal, wherein the first message comprises a PDU session release time information associated with the first PDU session;
receive a second message comprising a PDU session establishment request and a first PDU session identifier (ID) from the terminal after the terminal determines that a session and service continuity (SSC) mode for the first PDU session is a mode comprising releasing the first PDU session after establishing a new PDU session, wherein the first PDU session ID is associated with the first PDU session; and
send the second message to a session management function (SMF) entity based on an association between the first PDU session ID and an SMF ID associated with the SMF entity.

15. The network apparatus of claim 14, wherein the first message comprises the first PDU session ID associated with the first PDU session.

16. The network apparatus of claim 14, wherein the first message comprises a cause value indicating that the PDU session re-establishment to the same data network is required.

17. The network apparatus of claim 14, wherein the second message comprises a second PDU session ID associated with the new PDU session.

18. The network apparatus of claim 14, wherein the first PDU session is served by a second user plane function (UPF), and wherein the new PDU session is served by a first UPF.

19. The network apparatus of claim 14, wherein the SMF ID comprises a Media Access Control (MAC) address of the SMF entity.

20. The network apparatus of claim 14, wherein the SMF ID comprises a product number of the SMF entity.

* * * * *